(12) United States Patent
Mori et al.

(10) Patent No.: US 6,209,948 B1
(45) Date of Patent: Apr. 3, 2001

(54) FRONT STRUCTURE OF CAR BODY, AND METHOD OF ABSORBING IMPACT BY MEANS OF THE FRONT STRUCTURE

(75) Inventors: Takeo Mori; Toshiki Kitajima, both of Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/117,939

(22) PCT Filed: Nov. 29, 1996

(86) PCT No.: PCT/JP96/03509

§ 371 Date: Aug. 10, 1998

§ 102(e) Date: Aug. 10, 1998

(87) PCT Pub. No.: WO97/29005

PCT Pub. Date: Aug. 14, 1997

(30) Foreign Application Priority Data

Feb. 9, 1996 (JP) .................................................. 8-23852
Jun. 6, 1996 (JP) ................................................ 8-144225

(51) Int. Cl.⁷ ...................................................... B60J 7/00
(52) U.S. Cl. ...................... 296/188; 296/204; 296/189; 296/194
(58) Field of Search ............................. 296/204, 203.01, 296/203.02, 189, 188, 194

(56) References Cited

U.S. PATENT DOCUMENTS

| | | | |
|---|---|---|---|
| 2,613,986 | * 10/1952 | Heyl, Jr. | 296/204 |
| 2,788,223 | * 4/1957 | Mersheimer et al. | 296/204 |
| 2,856,226 | * 10/1958 | Purdy | 296/204 |
| 2,883,232 | * 4/1959 | Olley et al. | 296/204 |
| 2,954,998 | * 10/1960 | Kushler et al. | 296/204 |
| 3,108,836 | * 10/1963 | Deckert | 296/204 |
| 3,110,518 | * 11/1963 | Wessells, III | 296/204 |
| 3,162,478 | * 12/1964 | Richards | 296/204 |
| 3,202,451 | * 8/1965 | Auger et al. | 296/204 |
| 3,279,816 | * 10/1966 | Issigonis | 296/204 |
| 3,321,235 | * 5/1967 | Muller et al. | 296/204 |
| 3,423,122 | * 1/1969 | Wessells, III | 296/204 |
| 4,129,330 | * 12/1978 | Schwuchow | 296/204 |
| 4,712,829 | * 12/1987 | Hurten et al. | 296/204 |
| 4,804,222 | * 2/1989 | Sakiyama et al. | 296/204 |
| 4,892,350 | * 1/1990 | Kijima | 296/204 |

FOREIGN PATENT DOCUMENTS

| | | |
|---|---|---|
| 56-105483 | 8/1981 | (JP) . |
| 60-15510 | 4/1985 | (JP) . |
| 1-240383 | 9/1989 | (JP) . |
| 3-38288 | 4/1991 | (JP) . |
| 5-8763 | 1/1993 | (JP) . |
| 5-105116 | 4/1993 | (JP) . |
| 5-170139 | 7/1993 | (JP) . |
| 5-294257 | 11/1993 | (JP) . |
| 5573 | 6/1995 | (JP) . |

* cited by examiner

*Primary Examiner*—Joseph D. Pape
*Assistant Examiner*—Kiran Patel
(74) *Attorney, Agent, or Firm*—Pillsbury Madison & Sutro LLP

(57) ABSTRACT

A vehicle body front structure and an impact absorbing method thereof, in which an impact force applied to front side members is efficiently absorbed by an intended deformation of a reinforcing member. A part of the impact force applied to the front side members (12) is received by supporting forces in axial directions of a dash cross member (20) and a pillar brace (22). A recess (24) is provided in the dash cross member (20) in the portion thereof connected with the front side member (12). A recess (26) is provided in the pillar brace (22) in the portion thereof connected with the front side member (12). Due to the dash cross member (20) and the pillar brace (22) compressively deforming in the axial directions starting at these recesses (24), (26), the dash cross member (20) and the pillar brace (22) absorb impact force which is applied to the front side members (12) from the front of the vehicle.

7 Claims, 29 Drawing Sheets

FIG. 3
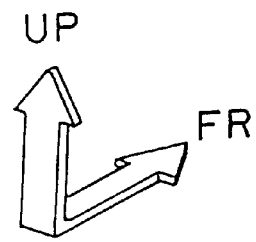
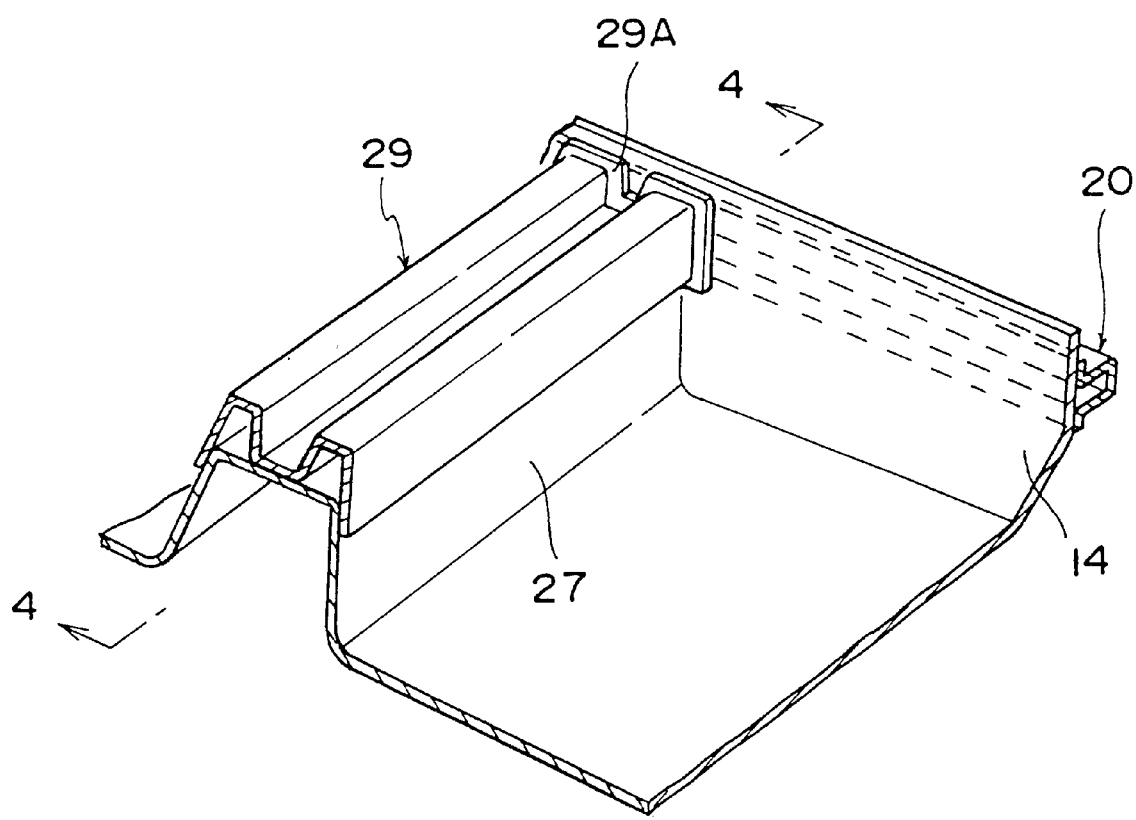

FRONT STRUCTURE OF CAR BODY, AND METHOD OF ABSORBING IMPACT BY MEANS OF THE FRONT STRUCTURE

This application is the national phase of international application PCT/JP96/03509, filed Nov. 29, 1996 which designated the U.S.

TECHNICAL BACKGROUND

The structure disclosed in Japanese Patent Application Publication No. 60-15510 is known as an example of a conventional vehicle body front structure at rear portions of front side members.

As illustrated in FIG. 29, in this vehicle body front structure, a cowl 70 of a vehicle body is locally expanded in a truncated pyramid shape to thereby form a base body 72 having a stable configuration and a large supporting capacity. Further, a front side member 74 is bifurcated by a bifurcating beam 76 fitted thereon before contacting the base body 72 having a stable configuration. At this time, a total of three arms 78, 80, 82 are formed. These arms surround at least one portion of the base body 72 having a stable configuration, so as to introduce the generated force proportionally. Further, the arm 78 ends in an inner tunnel wall 86 within the range of a longitudinal central axis 84 of the vehicle, and the arm 80 is supported on a front pillar 88. Further, the other arm 82 is obtained by extending the front side member 74, and is joined to a lower portion floor 92 and extends up to a sill 94 without interrupting transmission of a force.

Consequently, the impact force on the front side member 74 is supported by the inner tunnel wall 86, the front pillar 88 and the sill 94, which serve as frame members, via the three arms 78, 80, 82.

However, in this vehicle body front structure, the front side member 74 is crushed to absorb the impact force at the time of a collision, while the three arms 78, 80, 82 suppress the deformation of the vehicle compartment without having the intended impact-absorbing function.

A technique relating to the present invention is described in Japanese Patent Application Laid-Open No. 5-170139 which discloses a vehicle body front structure in which, when a vehicle traveling forward collides, deformation proceeds successively from the front portion toward the rear portion of the vehicle body, and as the deformation proceeds toward the rear portion, the amount of impact energy absorbed increases.

DISCLOSURE OF THE INVENTION

In view of the above-mentioned facts, an object of the present invention is to provide a vehicle body front structure and a method of absorbing an impact by a vehicle body front structure, in which the impact force applied to a front side member is efficiently absorbed by intended deformation of a reinforcing member.

A first aspect of the present invention is a vehicle body front structure in which a plurality of reinforcing members supported at frame members having stable configurations are connected to rear portions of front side members extending substantially horizontally in a vehicle longitudinal direction and provided so as to be offset upwardly from a floor panel, and an impact force applied to said front side members from a front of a vehicle is supported by compressive forces in axial directions of said plurality of reinforcing members, wherein at least one of said reinforcing members has an impact force absorbing portion at a portion connected with said front side member, said impact force absorbing portion compressively deforming in the axial direction of said reinforcing member and absorbing the impact force applied to said front side members from the front of the vehicle, and said at least one of said reinforcing members is a supporting structure displaceable, in a direction of increasing an angle between said reinforcing members, in accordance with compressive deformation at said impact force absorbing portion.

A second aspect of the present invention is a method of absorbing an impact by a vehicle body front structure a plurality of reinforcing members supported at frame members having stable configurations are connected to rear portions of front side members extending substantially horizontally in a vehicle longitudinal direction and provided so as to be offset upwardly from a floor panel, and an impact force applied to said front side members from a front of a vehicle is received by compressive forces in axial directions of said plurality of reinforcing members, wherein, when an impact force is applied to said front side members from the front of the vehicle, at least one of said reinforcing members compressively deforms in an axial direction at a portion connected with said front side member, and along with this compressive deformation, said at least one of said reinforcing members is displaced in a direction of increasing an angle between said plurality of reinforcing members, such that the axial direction compressive deformation of said reinforcing member proceeds while sustaining a reaction load against the impact force applied from said front side members.

In accordance with the present invention, when an impact force is applied to the front side members and the rear portions of the front side members deform rearwardly, the reinforcing members can effectively absorb the applied impact force while sustaining a high reaction load on the basis of the compressive deformation in the axial direction at the impact force absorbing portion formed at the portion connected with the front side member and on the basis of the displacement in a direction of increasing the angle between the reinforcing members which displacement accompanies the compressive deformation. Therefore, the impact force applied to the front side members can be absorbed efficiently by intended axial direction deformation of the reinforcing members.

BRIEF DESCRIPTION OF THE DRAWINGS

FIG. 3 is a perspective view, a portion of which is in cross-section, showing a floor tunnel portion of the vehicle body front structure according to the first embodiment of the present invention as taken from the rear inner side of the vehicle.

BEST MODE FOR IMPLEMENTING THE INVENTION

A first embodiment of the vehicle body front structure of the present invention will be described with reference to FIGS. 1 to 4.

In FIGS. 1 to 4, arrow FR indicates the vehicle forward direction, arrow UP indicates the vehicle upward direction, and arrow IN indicates the vehicle transverse inner side direction.

Figure 1:
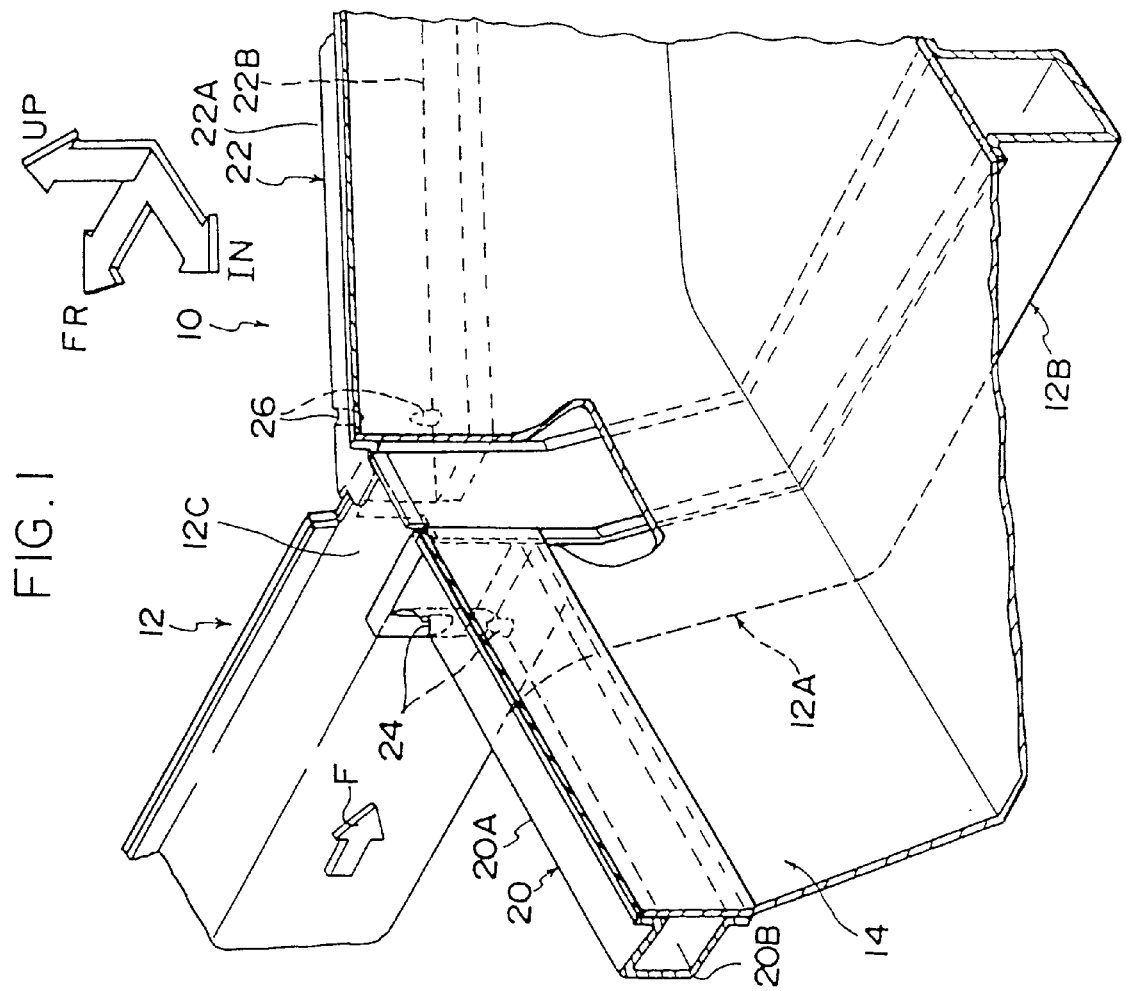
FIG. 1 is a perspective view, a portion of which is in cross-section, of a vehicle body front structure according to a first embodiment of the present invention as taken diagonally from a rear inner side of a vehicle.

As shown in FIG. 1, a pair of left and right front side members 12 are arranged along the longitudinal direction of the vehicle body at a vehicle body front portion 10 of the present first embodiment, in the vicinities of the vehicle transverse direction end lower portions (the front side member 12 on the left side of the vehicle is not shown). The front side member 12 has a closed sectional structure extending along the longitudinal direction of the vehicle body. The rear end portion of the front side member 12 is welded to a dash lower panel 14 partitioning the engine room and the vehicle compartment. FIG. 1 is a partly cutaway view of the dash lower panel 14 at the rear end portion of the front side member 12. Further, an inclined portion 12A extending rearward to the lower part of the vehicle body along the dash lower panel 14 is formed at the rear end portion of the front side member 12. The lower end portion of the inclined portion 12A is a horizontal portion 12B extending toward the rear of the vehicle body.

The cross-sectional configuration as seen from the longitudinal direction of the inclined portion and the horizontal portion 12B of the front side member 12 is substantially U-shaped with the opening thereof directed toward the dash lower panel 14. The left and right flanges formed at the open end portion are welded to the dash lower panel 14. Accordingly, the inclined portion 12A and the horizontal portion 12B of the front side member 12 together with the dash lower panel 14 form a closed cross-sectional portion extending in the vehicle longitudinal direction in plan view.

A dash cross member 20 serving as a first reinforcing member is inserted along the vehicle transverse direction between rear portions 12C which form the upper end portions of the inclined portions 12A of the left and right front side members 12. The dash cross member 20 connects the rear portions of the left and right front side members 12 along the vehicle transverse direction. The cross-sectional configuration of the dash cross member 20 as seen from the longitudinal direction is substantially U-shaped with the opening thereof directed toward the rear of the vehicle. Upper and lower flanges formed at the open end portion of the dash cross member 20 are welded to the dash lower panel 14. Accordingly, the dash cross member 20 together with the dash lower panel 14 forms a closed cross-sectional portion connecting the left and right front side members 12.

A pillar brace 22 serving as a second reinforcing member is inserted substantially horizontally between each of the rear portions 12C of the left and right front side members 12 and a front pillar (not shown) serving as a frame member. The pillar braces 22 connect the rear portions 12C of the left and right front side members 12 and the front pillars to each other.

Thus, the front side member 12, the dash cross member 20, and the pillar brace 22 form a substantially Y-shaped structure in plan view. The two branches of the substantially Y-shaped structure are formed by the dash cross member 20 and the pillar brace 22. A part of the impact force applied to the front side member 12 is received by the respective axial direction supporting forces of the dash cross member 20 and the pillar brace 22.

Recesses 24 serving as impact force absorbing portions are provided at the portion of the dash cross member 20 connected with the front side member 12. The recesses 24 are formed at positions opposing one another on upper and lower ridgelines 20A, 20B of the vehicle front side of the dash cross member 20. Due to the dash cross member 22 being compressively deformed in the axial direction with the recesses as the starting points of the compressive deformation, the impact force (arrow F in FIG. 1) applied to the front side member 12 from the front of the vehicle is absorbed.

Recesses 26 serving as impact force absorbing members are provided at the portion of the pillar brace 22 connected with the front side member 12. The recesses 26 are formed at positions opposing one another on upper and lower ridgelines 22A, 22B of the vehicle front side of the pillar brace 22. Due to the pillar brace 22 being compressively deformed in the axial direction with the recesses 26 as the starting points of the compressive deformation, the impact force (arrow F in FIG. 1) applied to the front side member 12 from the front of the vehicle is absorbed.

As shown in FIG. 3, a tunnel reinforcement 29 forming a part of the frame member is disposed at the upper portion of a floor tunnel portion 27. The tunnel reinforcement 29 together with the upper portion of the floor tunnel portion 27 forms a closed cross-sectional portion extending in the longitudinal direction of the vehicle.

Figure 4:
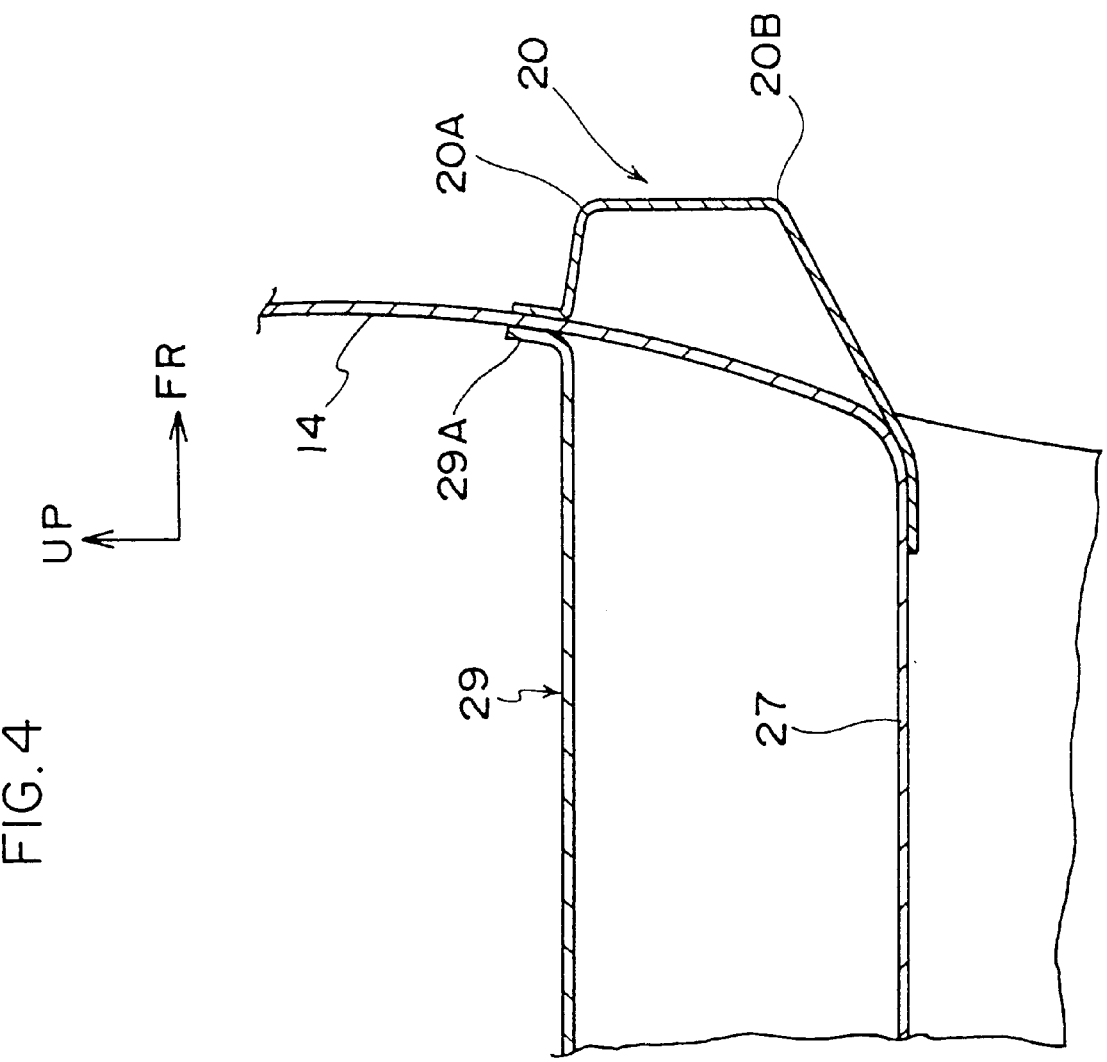
FIG. 4 is a sectional view taken along line 4—4 of FIG. 3.

As shown in FIG. 4, a flange 29A formed at the front end outer peripheral portion of the tunnel reinforcement 29 is connected to the vehicle transverse direction central portion of the dash cross member 20 such that the dash lower panel 14 is sandwiched therebetween.

Next, operation of the present first embodiment will be explained.

Figure 5:
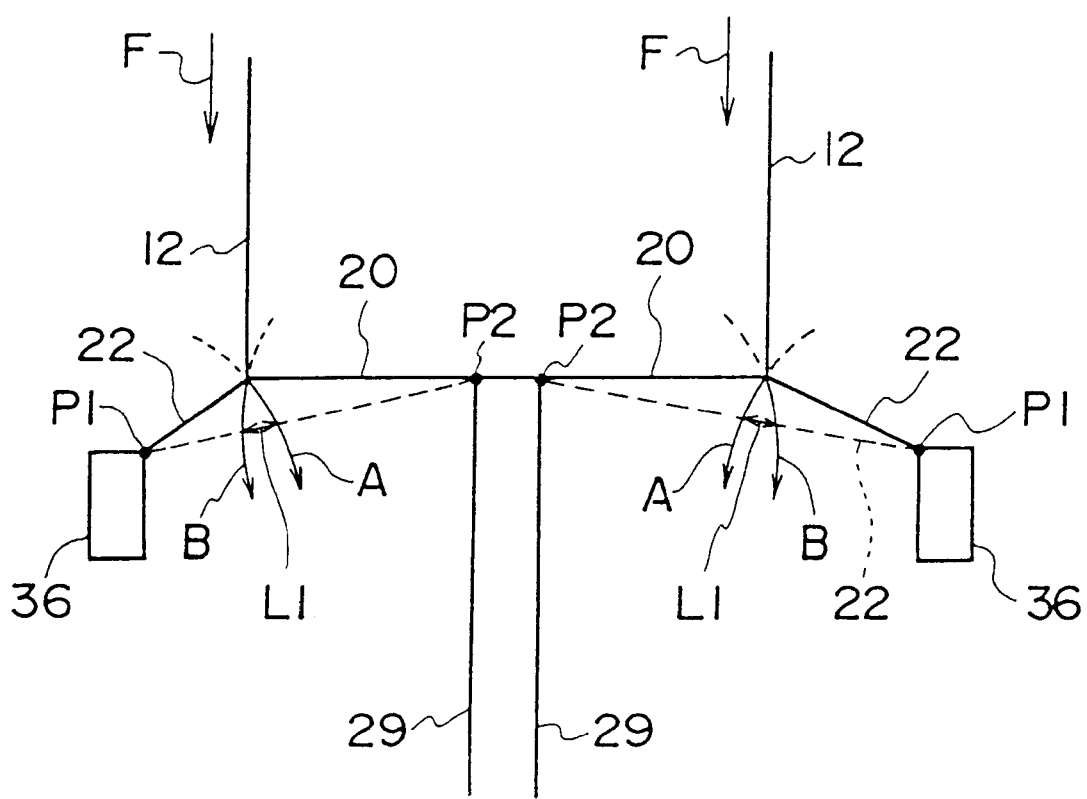
FIG. 5 is a diagram for explaining the operation in a case in which an impact load is applied to the left and right front side members of the vehicle body front structure according to the first embodiment of the present invention.

As shown in FIG. 5, arc-shaped loci (dashed lines in FIG. 5), for a case in which the pillar braces 22 are rotated rearward (in the directions of arrows A in FIG. 5) in planes about connection points P1 with the front pillars 36, overlap arc-shaped loci (dashed lines in FIG. 5), for a case in which the dash cross members 20 are rotated rearward (in the directions of arrows B in FIG. 5) in planes about connection points P2 with the tunnel reinforcement 29.

In order for the front side members 12 to move substantially toward the rear of the vehicle when an impact load (arrows F in FIG. 5) is applied to the left and right front side members 12 from the front of the vehicle, the pillar braces 22 and/or the dash cross members 20 must be compressively deformed within the regions L1 where the arc-shaped loci of the pillar braces 22 and those of the dash cross members 20 overlap.

Figure 2:
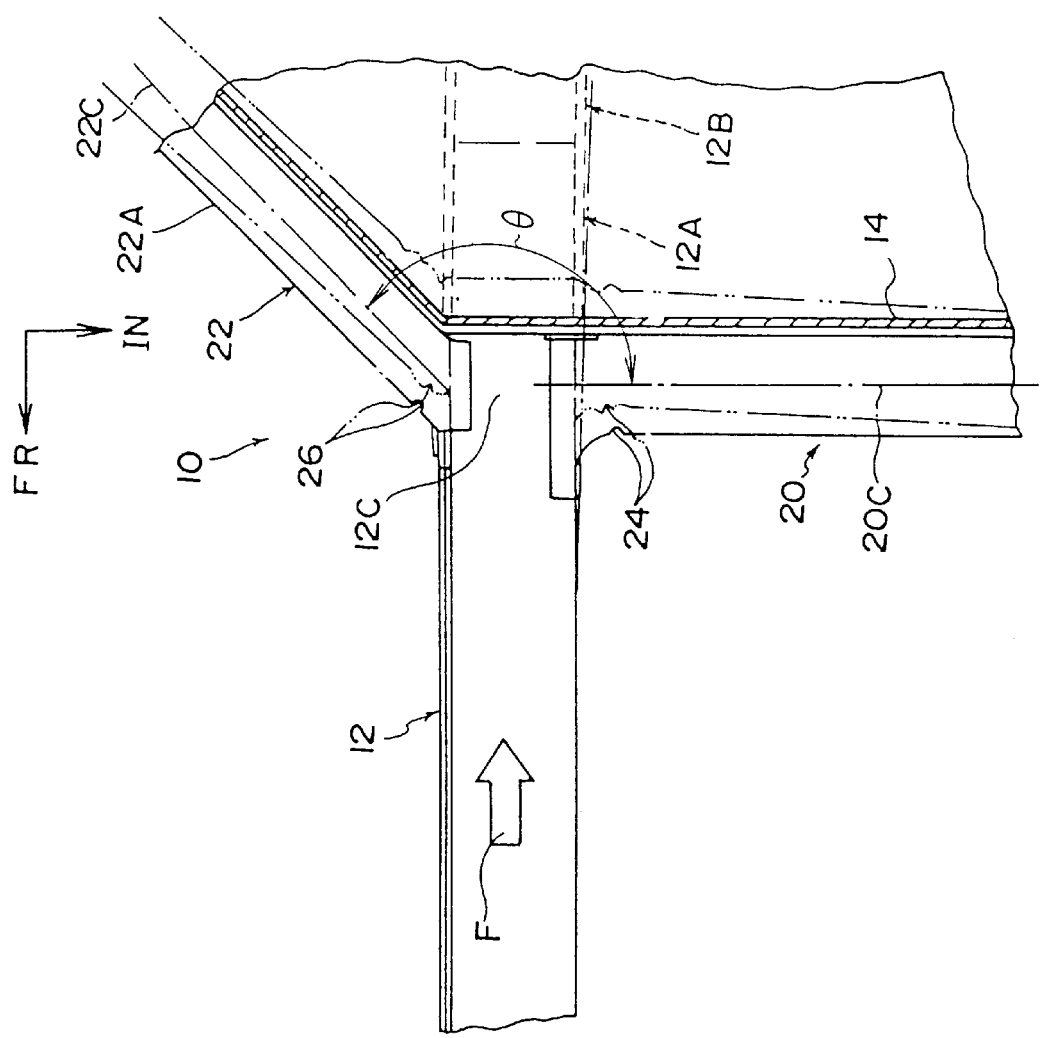
FIG. 2 is a plan view showing the vehicle body front structure according to the first embodiment of the present invention.

According to the present first embodiment, as shown in FIG. 2, the recesses 24 are formed at the portions of the dash cross members 20 connected with the front side members 12, and the recesses 26 are formed at the portions of the pillar braces 22 connected with the front side members 12. Consequently, when an impact load (arrow F in FIG. 2) is applied to the left and right front side members 12 from the front of the vehicle, the recesses 24, 26 are the start of the compressive deformation, and thereafter, the dash cross members 20 and the pillar braces 22 are compressively deformed, as shown by two-dot chain lines in FIG. 2, from the portions thereof connected with the front side members 12. Along with this compressive deformation, the dash cross members 20 and the pillar braces 22 are displaced in a direction of increasing the angle θ therebetween, about fulcra which are the portions thereof connected to the tunnel reinforcement 29 and the portions thereof connected to the front pillars. The deformation of the dash cross members 20 and the pillar braces 22 proceeds while supporting a high reaction load.

Accordingly, the pillar braces 22 and the dash cross members 20 do not bend so as to be unable to produce a reaction load. A stable impact absorbing function can be improved, and therefore, the impact force applied to the front side members 12 can be efficiently absorbed.

According to the present first embodiment, the flange 29A formed on the front end outer peripheral portion of the tunnel reinforcement 29 is joined to the vehicle transverse direction central portion of the dash cross member 20 such that the dash lower panel 14 is sandwiched therebetween. Therefore, due to the tunnel reinforcement 29, the amount of movement of the dash cross member 20 toward the inner side of the vehicle compartment can be reduced, and the impact force can be distributed and supported by the tunnel reinforcement 29.

In the vehicle body front structure according to the present first embodiment, recesses 24, 26 serving as impact force absorbing portions are provided at both the dash cross members 20 and the pillar braces 22. However, it suffices to form the recesses serving as the impact force absorbing portions in only one of the dash cross member 20 and the pillar brace 22. Further, the impact force absorbing portion is not limited to a recess, and may be any structure that can serve as the start of compressive deformation. Another impact force absorbing portion such as a notch or the like suffices.

Figure 6:
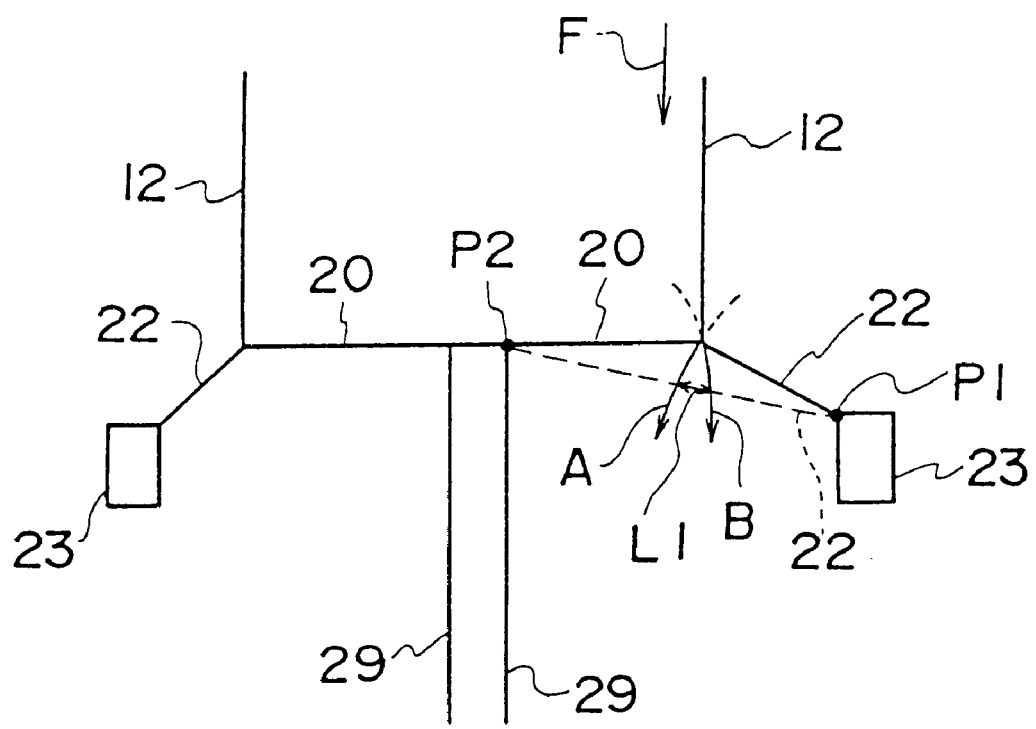
FIG. 6 is a diagram for explaining the operation in a case in which an impact load is applied to the right front side member of the vehicle body front structure according to the first embodiment of the present invention.

Explanation was made above with reference to FIG. 5 of a case in which an impact load is applied to the left and right front side members 12 from the front of the vehicle. However, in a case in which an impact load is applied from the front of the vehicle to one of the left and right front side members, e.g., the right front side member 12, as shown in FIG. 6, the pillar brace 22 and the dash cross member 20 at the side to which the impact load is applied are compressively deformed, and this compressive deformation proceeds while supporting a high reaction load.

Figure 7:
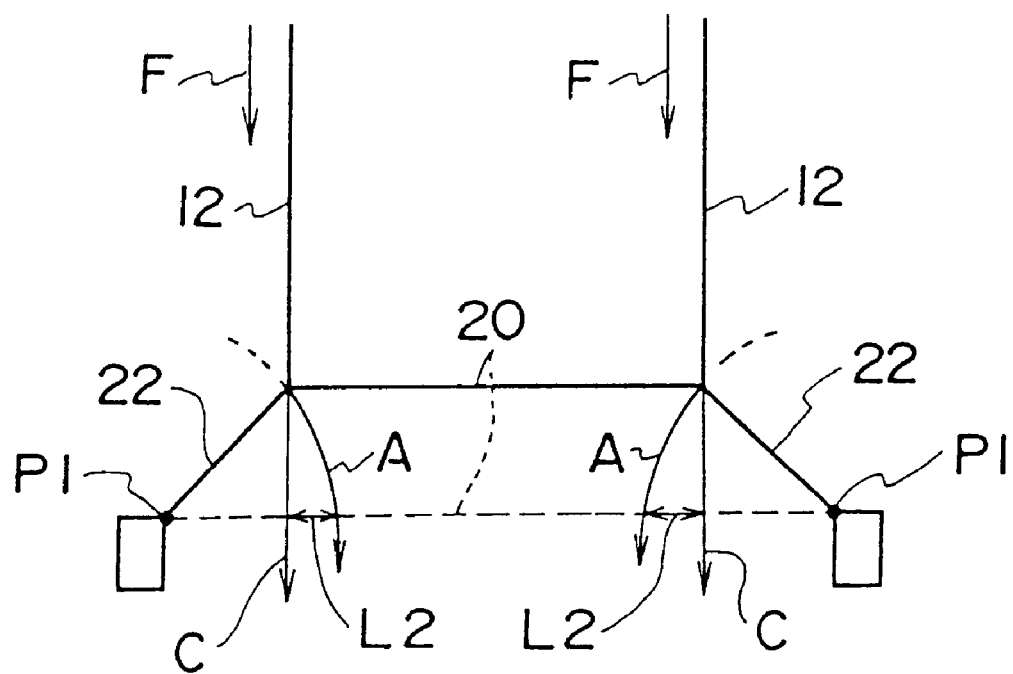
FIG. 7 is a diagram for explaining the operation in a case in which an impact load is applied to the left and right front side members of a vehicle without a tunnel reinforcement in the vehicle body front structure according to the first embodiment of the present invention.

Further, as illustrated in FIG. 7, in a vehicle not equipped with a tunnel reinforcement 29, in a case in which an impact load (arrows F in FIG. 7) is applied to the left and right front side members 12 from the front of the vehicle, in order for the left and right front side members 12 and the dash cross member 20 to move toward the rear of the vehicle, the pillar braces 22 must compressively deform in regions L2 where the arc-shaped loci of the pillar braces overlap the locus of rearward movement (arrows C in FIG. 7) of the dash cross member 20. The same operational effect as that of the first embodiment can be obtained by forming an impact force absorbing portion at the portions of the pillar braces 22 connected to the front side members 12.

Figure 8:
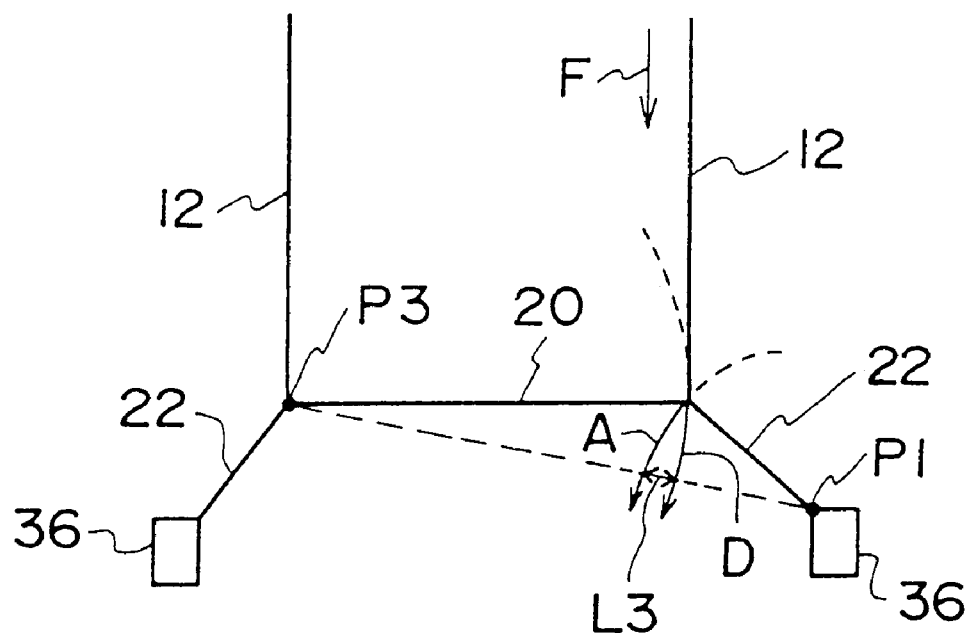
FIG. 8 is a diagram for explaining the operation in a case in which an impact load is applied to the right front side member of a vehicle without a tunnel reinforcement in the vehicle body front structure according to the first embodiment of the present invention.

As illustrated in FIG. 8, in a vehicle which is not equipped with a tunnel reinforcement 29, in a case in which an impact load is applied from the front of the vehicle to one of the left and right front side members 12, e.g., the right front side member 12, in order for the front side member 12 to move substantially toward the rear of the vehicle, at least one of the pillar brace 22 and the dash cross member 20 must compressively deform in a region L3 where the arc-shaped locus of the pillar brace 22 overlaps the arc-shaped locus of the dash cross member 20 rotated rearward (in the direction of arrow C in FIG. 8) in a plane about a point P3 at which the dash cross member 20 is connected to the left front side member 12. Therefore, an operational effect similar to that of the first embodiment can be obtained by forming an impact force absorbing portion at at least one of the dash cross member 20 and the pillar brace 22.

Figure 9:
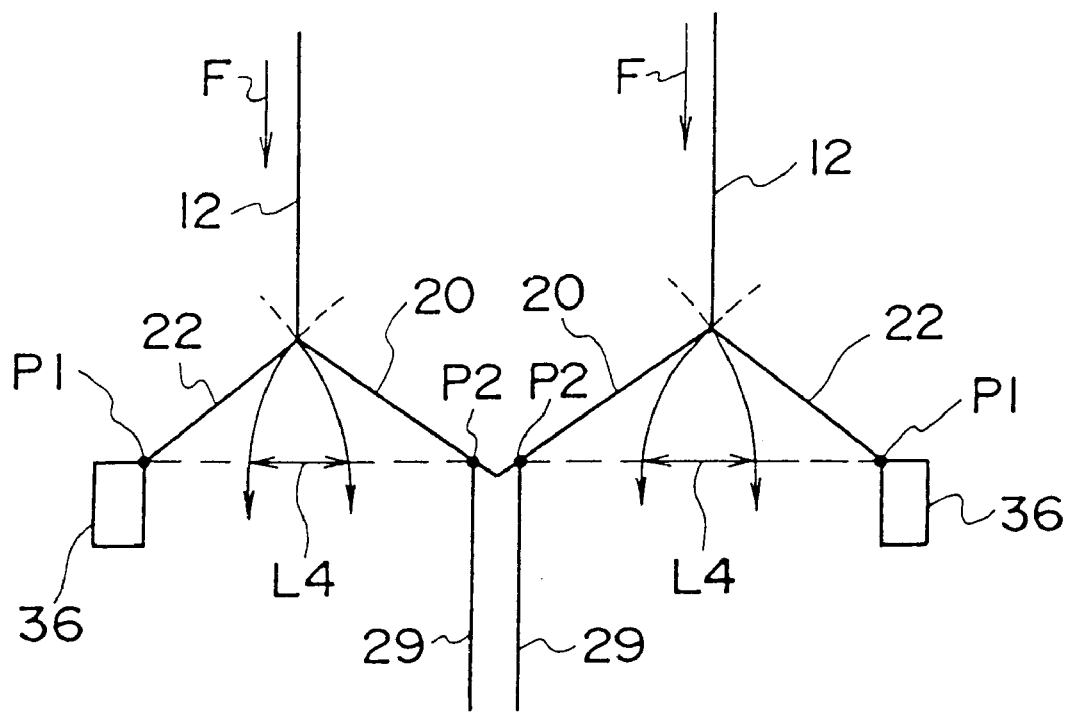
FIG. 9 is a diagram for explaining the operation in a case in which an impact load is applied to the left and right front side members of a vehicle body front structure according to a modified example of the first embodiment of the present invention.
Figure 10:
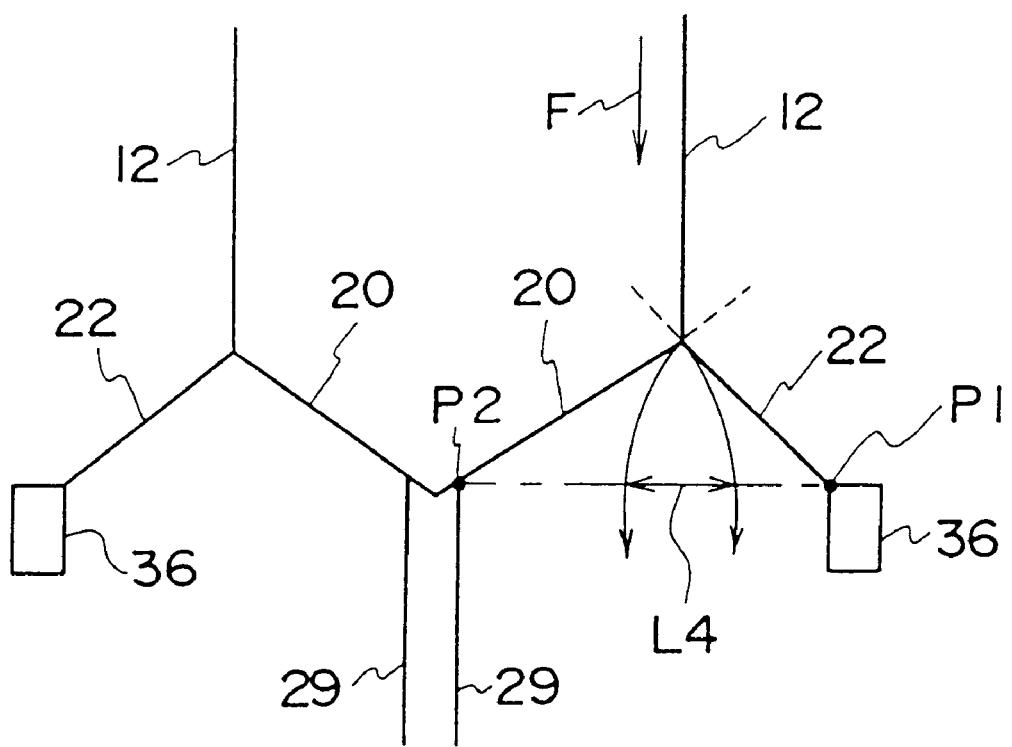
FIG. 10 is a diagram for explaining the operation in a case in which an impact load is applied to the right front side member of the vehicle body front structure in the modified example of the first embodiment of the present invention.

As illustrated in FIG. 9, in a vehicle in which dash cross members 20 and pillar braces 22 are disposed from the rear ends of the left and right front side members 12 diagonally toward the rear of the vehicle, in a case in which an impact load is applied to the left and right front side members 12 from the front of the vehicle, the pillar braces 22 and/or the dash cross members 20 must compressively deform in regions L4 where the arc-shaped loci of the pillar braces 22 and the arc-shaped loci of the dash cross members 20 overlap. The same operational effect as that of the first embodiment can be obtained by forming impact force absorbing portions at the dash cross members 20 and/or the pillar braces 22. In this vehicle, in a case in which an impact load is applied from the front of the vehicle to one of the left and right front side members 12, e.g., the right front side member 12, the pillar brace 22 and the dash cross member 20 at the side to which the impact load is applied compressively deform as shown in FIG. 10, and this compressive deformation proceeds while supporting a high reaction load.

Next, a second embodiment of a vehicle body front structure of the present invention will be explained with reference to FIGS. 11 to 13.

Members which are the same as those of the first embodiment are designated by the same reference numerals, and description thereof is omitted.

Figure 11:
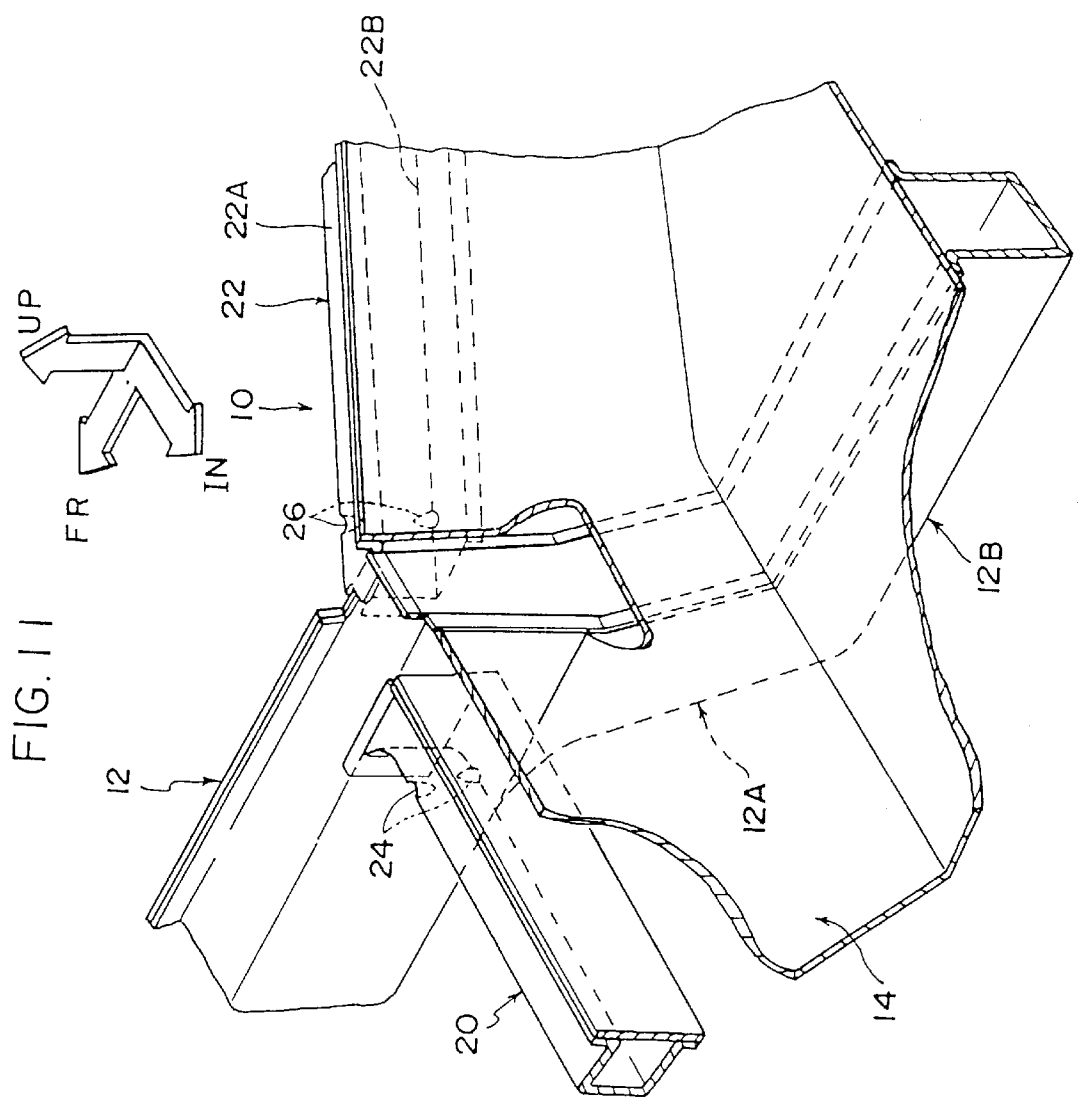
FIG. 11 is a perspective view, a portion of which is in cross-section, of a vehicle body front structure according to a second embodiment of the present invention as taken diagonally from a rear inner side of a vehicle.
Figure 12:
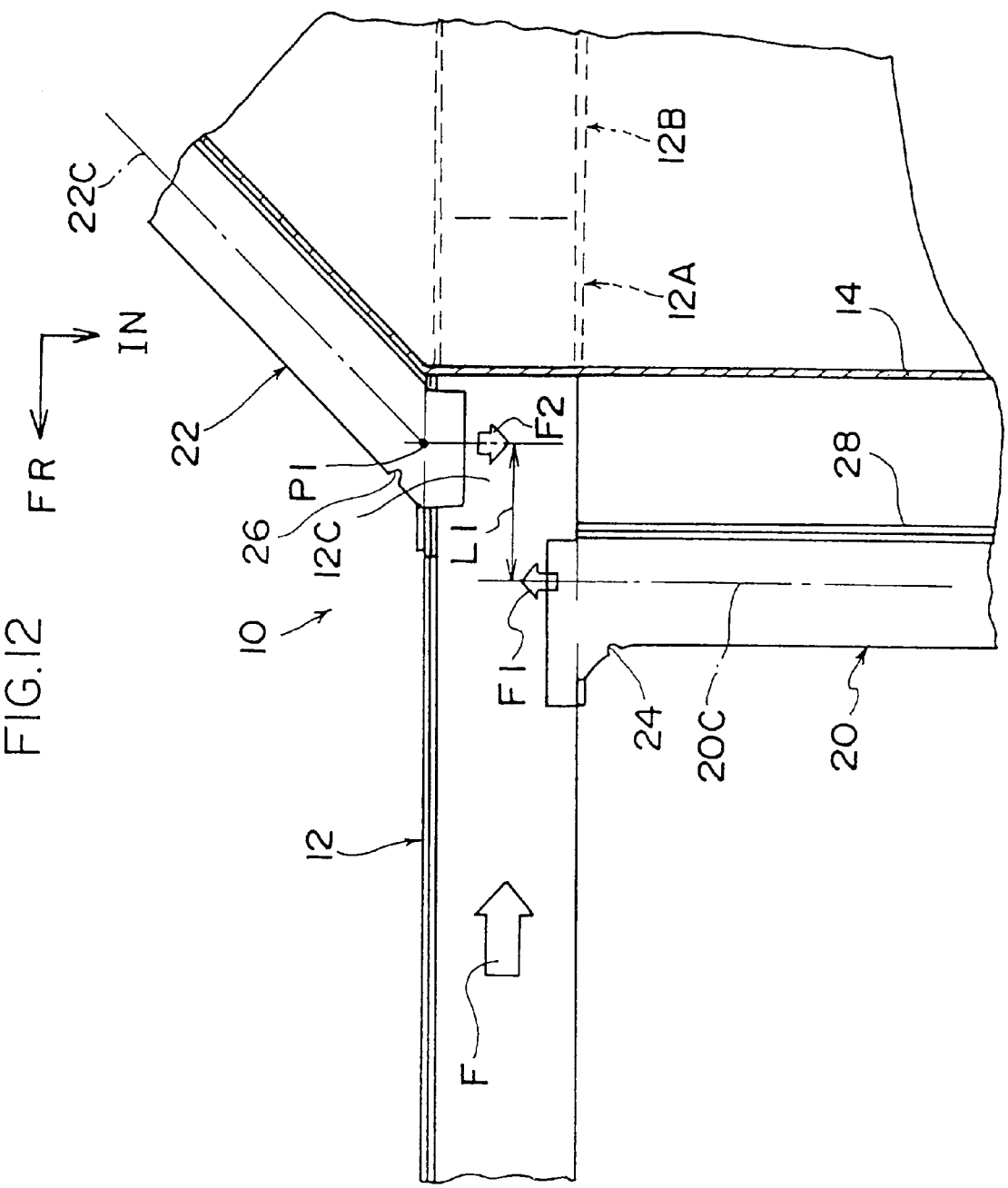
FIG. 12 is a plan view showing the vehicle body front structure according to the second embodiment of the present invention.
Figure 13:
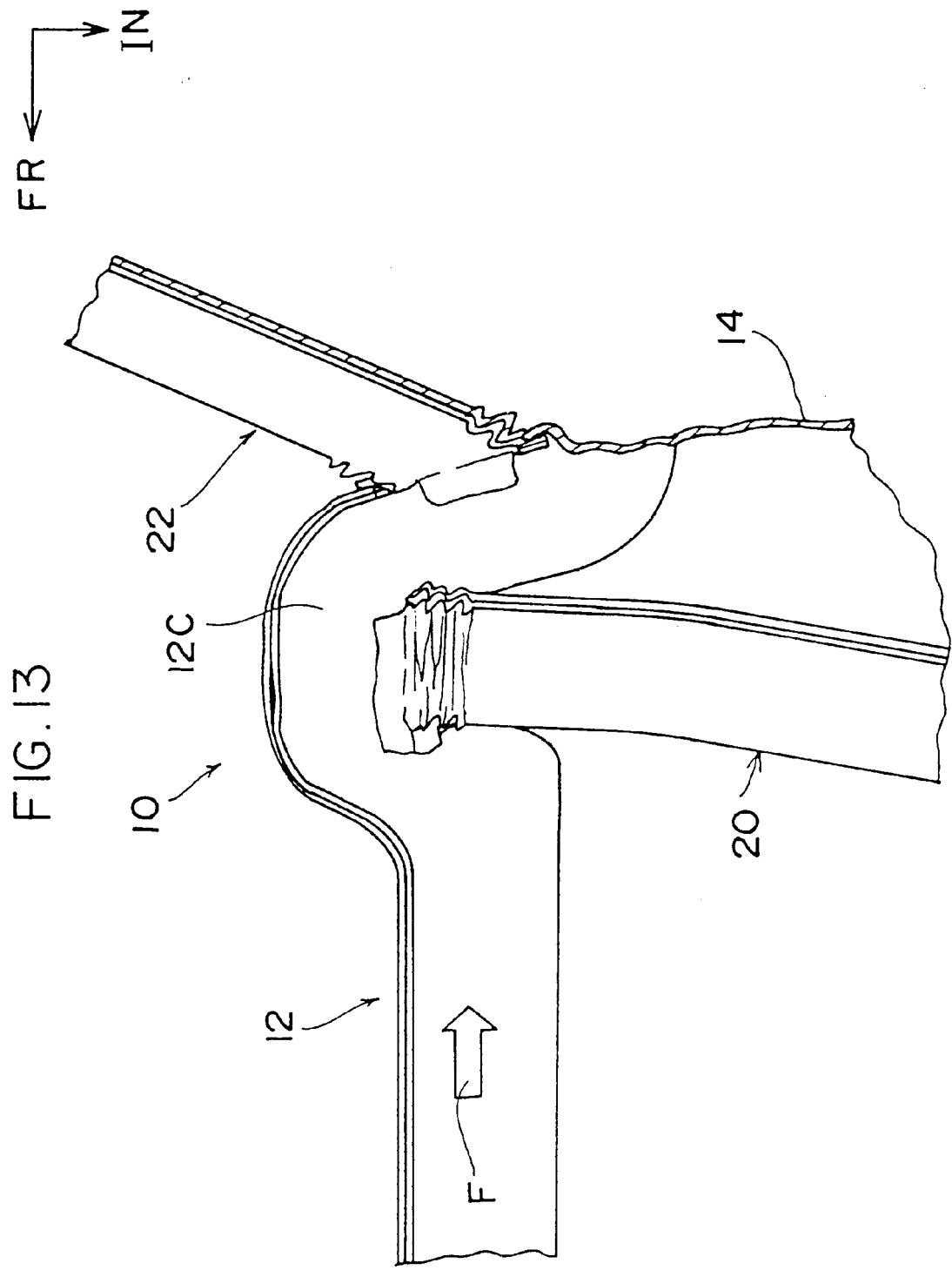
FIG. 13 is a diagram, corresponding to FIG. 12, for explaining the operation of the vehicle body front structure according to the second embodiment of the present invention.

As shown in FIG. 11, in the vehicle body front structure according to the present second embodiment, a dash cross member 20 is disposed at a position nearer to the front of the vehicle body than in the first embodiment As a result, as shown in FIG. 12, an axial line 20C of the dash cross member 20 is offset (by an offset amount L1) toward the front of the vehicle with respect to a front side member 12 side end portion P1 of an axial line 22C of the pillar brace 22.

Upper and lower flanges formed at the open end portion of the dash cross member 20 are respectively welded to a dash cross member inner panel 28. Accordingly, the dash cross member 20 together with the dash cross member inner panel 28 forms a closed cross-section portion connecting the left and right front side members 12.

Next, operation of the present second embodiment will be explained.

In the present second embodiment, as illustrated in FIG. 12, when an impact force is applied from the front of the vehicle (arrow F in FIG. 12) to the front side member 12, at least one of the dash cross member 20 and the pillar brace 22 (both in the present second embodiment) compressively deforms while sustaining a high load as in the first embodiment. Because the axial line 20C of the dash cross member 20 is offset (by an offset amount L1) toward the front of the vehicle body with respect to the front side member 12 side end portion P1 of the axial line 22C of the pillar brace 22, in the final stage of the compressive deformation process, when the rear portion 12C of the front side member 12 deforms rearwardly, the rear portion 12C of the front side member 12 bendingly buckles to the left and the right and deforms as shown in FIG. 13 due to the reaction load (pushing-back force) applied by the dash cross member 20 to the portion of the front side member 12 connected to the dash cross member 20 outwardly in the transverse direction of the vehicle (arrow F1 in FIG. 12) and also due to the reaction load applied by the pillar brace 22 to the portion of the front side member 12 connected to the pillar brace 22 inwardly in the transverse direction of the vehicle (arrow F2 in FIG. 12).

Accordingly, it is possible to reduce the amount of movement of the rear portion 12C of the front side member 12 toward the rear of the vehicle, i.e., toward the inner side of the vehicle compartment.

Next, a third embodiment of the vehicle body front structure according to the present invention will be described with reference to FIG. 14.

Members which are the same as those in the first embodiment are designated by the same reference numerals, and description thereof is omitted.

Figure 14:
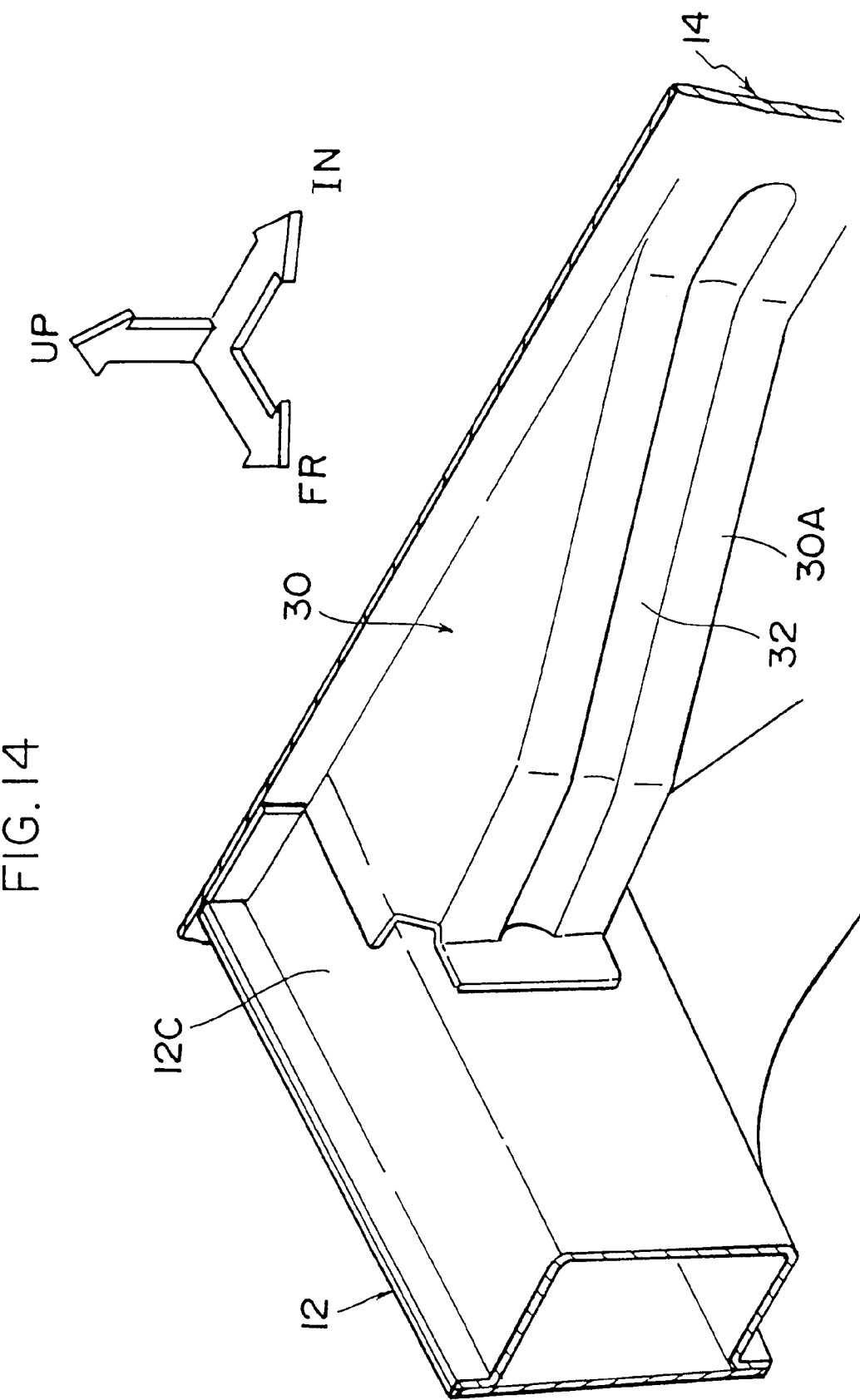
FIG. 14 is a perspective view, a portion of which is in cross-section, of a portion of a vehicle body front structure according to a third embodiment of the present invention as taken diagonally from a front inner side of a vehicle.

As shown in FIG. 14, in the vehicle body front structure according to the present third embodiment, in place of the dash cross member 20 (see FIG. 1) of the first embodiment, the upper portion of the dash lower panel 14 is made to bulge toward the front of the vehicle to form a bulging portion 30 serving as a first reinforcing member. The amount of protrusion of the bulging portion 30 toward the front of the vehicle gradually increases in a vicinity of the rear portion 12C of the front side member 12. A bead 32 for reinforcement is formed along the transverse direction of the vehicle at substantially the vertical direction central portion of a front wall portion 30A of the bulging portion 30.

Next, operation of the present third embodiment of the invention will be explained.

In the present third embodiment, because the upper portion of the dash lower panel 14 is made to bulge toward the front of the vehicle so as to form the bulging portion 30 serving as the first reinforcing member, it is not necessary to add a separate reinforcing member such as the dash cross member 20 of the first embodiment. The number of parts can therefore be reduced as compared with the first embodiment.

Further, because the bulging portion 30 serving as the first reinforcing member is integrally formed with the dash lower panel 14, the in-plane force of the dash lower panel 14 can be utilized sufficiently.

Next, a fourth embodiment of the vehicle body front structure according to the present invention will be explained with reference to FIG. 15.

Parts which are the same as those of the first embodiment are designated by the same reference numerals, and description thereof is omitted.

Figure 15:
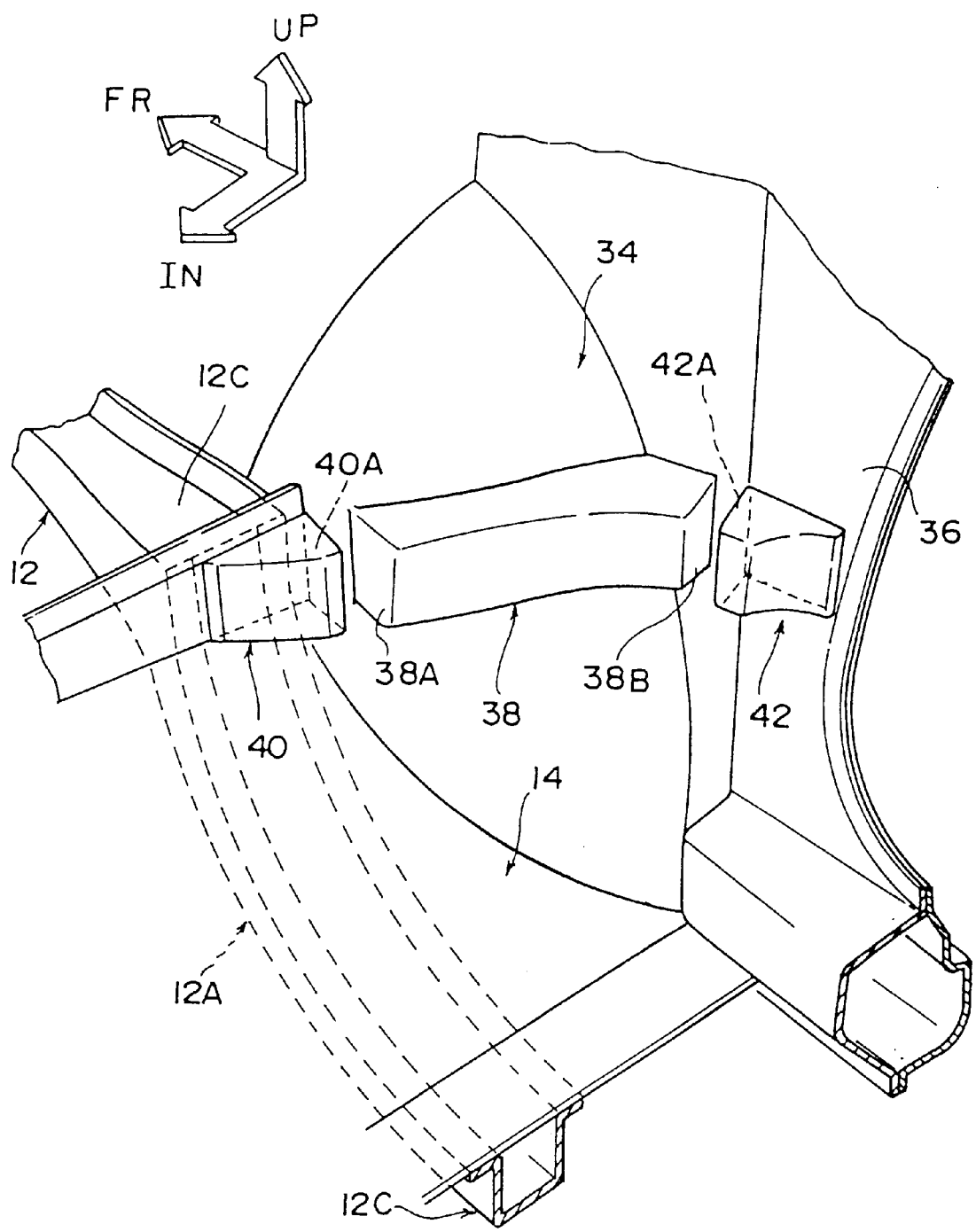
FIG. 15 is a perspective view, a portion of which is in cross-section, of a vehicle body front structure according to a fourth embodiment of the present invention as taken diagonally from a rear inner side of a vehicle.

As shown in FIG. 15, in the vehicle body front structure according to the present fourth embodiment, in place of the pillar brace 22 (see FIG. 1) of the first embodiment, a bulging portion 38 serving as a second reinforcing member is formed inward toward the vehicle compartment at a region of a cowl side panel 34 between the rear portion 12C of the front side member 12 and the front pillar 36 serving as a frame member. Further, a bulging portion 40 serving as a second reinforcing member is formed inward toward the vehicle compartment at a region of the dash lower panel 14 behind the rear portion 12C of the front side member 12. The vehicle transverse direction outer side end surface 40A of the bulging portion 38 opposes the vehicle transverse direction inner side end surface 38A of the bulging portion 38.

A bulging portion 42 serving as a second reinforcing member is formed inward toward the vehicle compartment at the front pillar 36. The vehicle front side end surface 42A of the bulging portion 42 opposes a vehicle transverse direction outer side rear end surface 38B of the bulging portion 38. A door check arm bracket (not shown) similar in shape to the bulging portion 42 of the front pillar 36 is provided on the bulging portion 42.

Next, operation of the present fourth embodiment will be explained.

In the present fourth embodiment, when an impact force is applied from the front of the vehicle to the front side members 12 and the rear portions 12C of the front side members 12 deform rearwardly, the opposing end surfaces of the bulging portions 38, 40, 42 abut one another in a short time and support a part of the impact force. Therefore, the amount of movement of the rear portions 12C of the front side members 12 inward toward the vehicle compartment is decreased.

Further, because the cowl side panel 34, the dash lower panel 14, and the front pillar 36 are made to bulge inward toward the vehicle compartment so as to form the bulging portions 38, 40, 42 serving as the second reinforcing members, it is not necessary to add a separate reinforcing member such as the pillar brace 22 of the first embodiment. The number of parts thus can be reduced as compared with the first embodiment.

Next, a fifth embodiment of the vehicle body front structure according to the present invention will be explained with reference to FIG. 16.

The same members as those in the first embodiment are designated by the same reference numerals, and description thereof is omitted.

Figure 16:
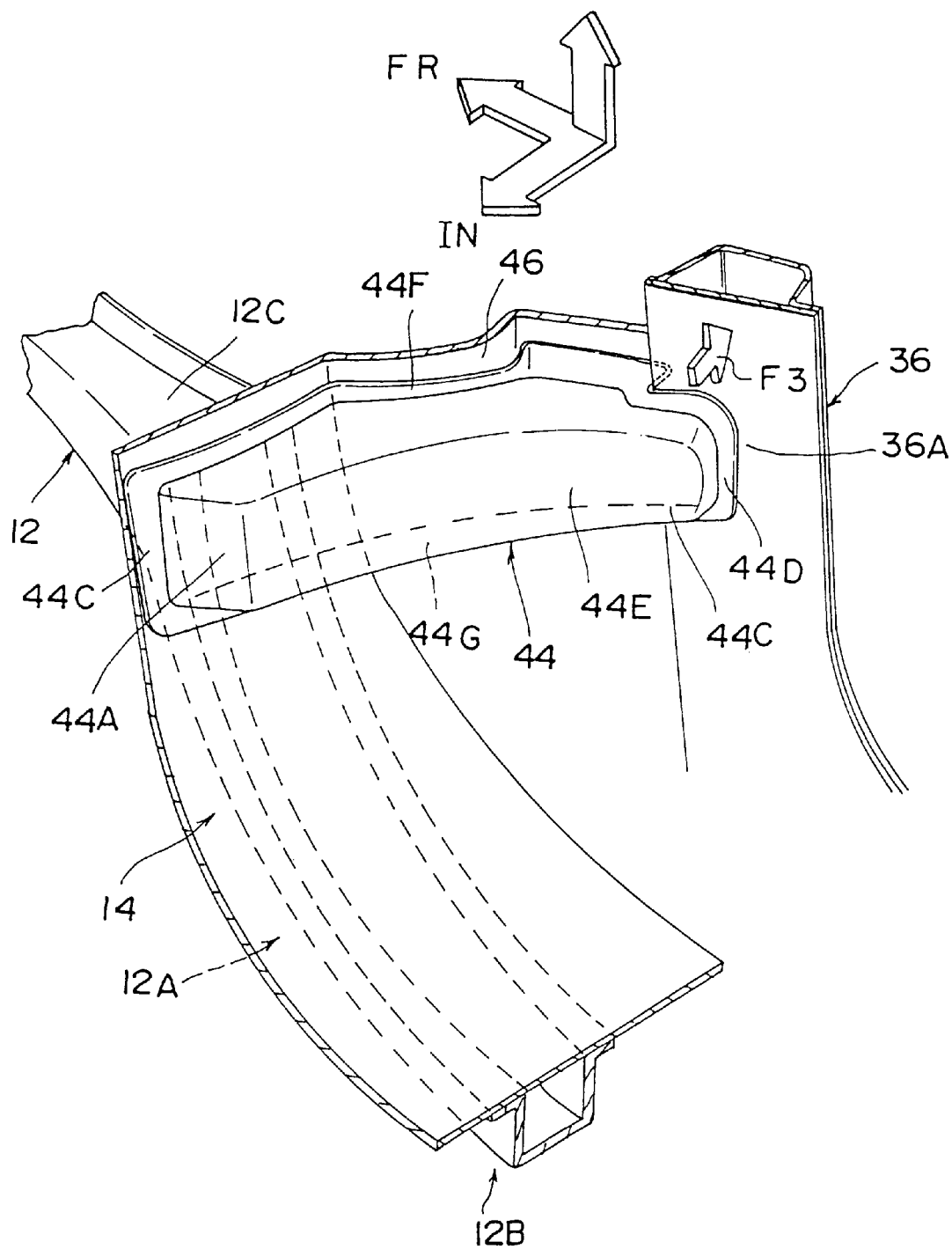
FIG. 16 is a perspective view, a portion of which is in cross-section, of a vehicle body front structure according to a fifth embodiment of the present invention as taken diagonally from a rear inner side of a vehicle.

As shown in FIG. 16, in the vehicle body front structure according to the present fourth embodiment, a pillar brace 44 serving as a second reinforcing member is disposed at the side of the dash lower panel 14 near to the vehicle compartment, and connects the rear portion 12C of the front side member 12 and the front pillar 36. The cross-sectional configuration as seen from the longitudinal direction of the pillar brace 44 is substantially U-shaped. A flange 44B formed on the outer peripheral portion of a vehicle transverse direction inner side end portion 44A of the pillar brace 44 is welded to the rear side surface of the dash lower panel 14 opposed to the rear portion 12C of the front side member 12.

In consideration of a case in which it would be difficult to weld to the front pillar 36 having a closed cross-sectional structure, a vehicle transverse direction outer side end rear portion 44C of the pillar brace 44 is made to bulge toward the vehicle transverse direction inner side of the front pillar 36 so as to oppose a vehicle transverse direction inner side surface 36A of the front pillar 36. A flange 44D formed on the outer peripheral portion of the vehicle transverse direction outer side end rear portion 44C opposes the vehicle transverse direction inner side surface 36A of the front pillar 36.

Further, upper and lower flanges 44F, 44G of a vehicle transverse direction intermediate portion 44E of the pillar brace 44 are joined to the cowl side panel 46, and a reinforcement (not shown) is disposed in the front pillar 36.

Next, operation of the present fifth embodiment will be explained.

In the present fifth embodiment, the vehicle transverse direction outer side end rear portion 44C of the pillar brace 44 opposes the vehicle transverse direction inner side surface 36A of the front pillar 36. Therefore, the connection between the pillar brace 44 and the front pillar 36 is not complicated. In a case in which the pillar brace 44 moves in the axial direction, the force exerted outwardly in the transverse direction of the vehicle (arrow F3 in FIG. 16) at the connecting portion of the pillar brace 44 and the front pillar 36 can be reliably supported by the front pillar 36.

Next, a sixth embodiment of the vehicle body front structure of the present invention will be explained with reference to FIG. 17.

Members which are the same as those of the fifth embodiment are designated by the same reference numerals, and description thereof is omitted.

Figure 17:
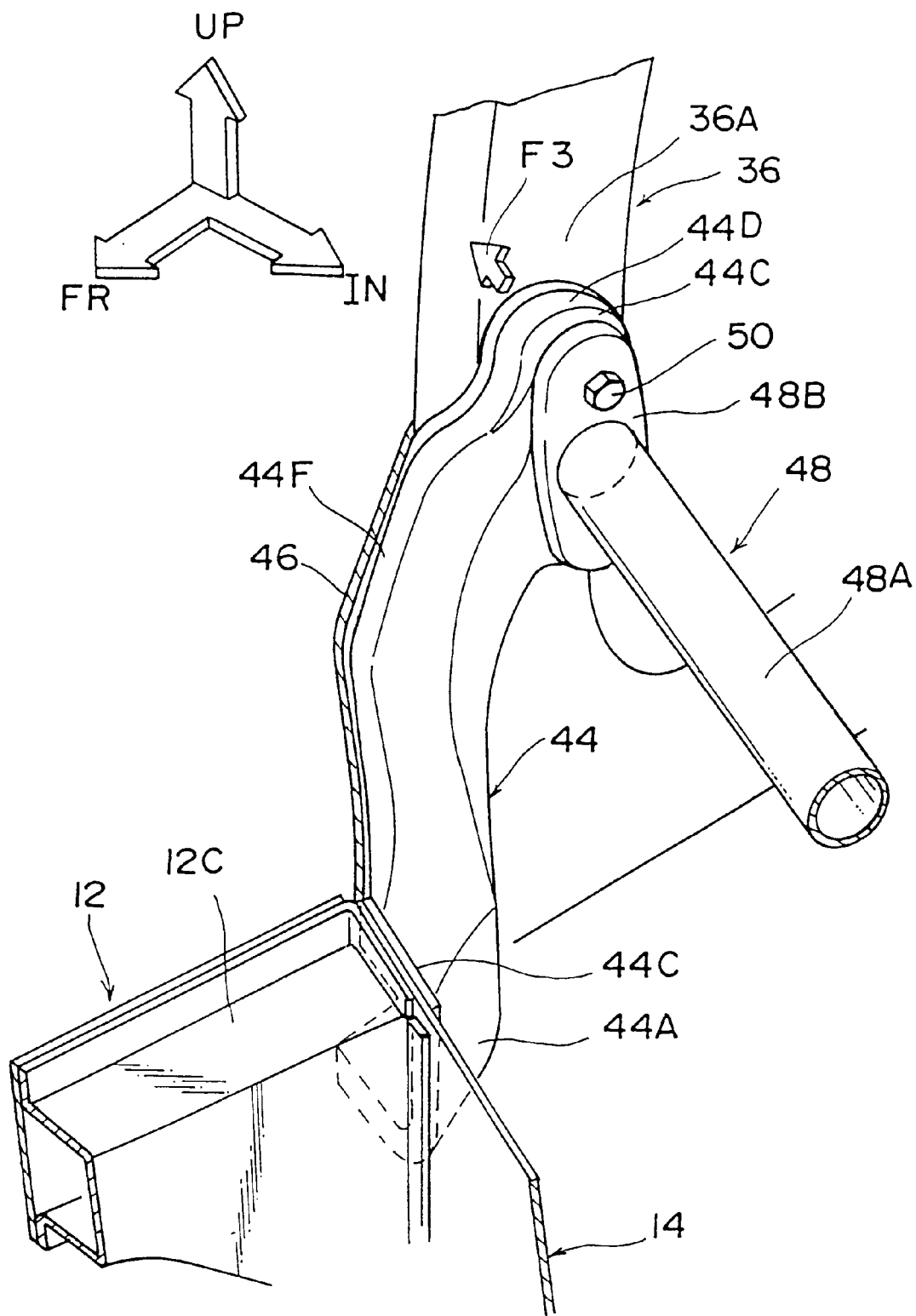
FIG. 17 is a perspective view, a portion of which is in cross-section, of a vehicle body front structure according to a sixth embodiment of the present invention as taken diagonally from a front inner side of a vehicle.

A shown in FIG. 17, in the present sixth embodiment, a cross member 48, which serves as a third reinforcing member and connects the vehicle transverse direction inner side surfaces 36A of the left and right pillars 36, is joined to the vehicle transverse direction outer side end rear portions 44C which are the portions of the pillar braces 44 connected with the front pillars 36. This cross member 48 has a plate-shaped connection portion 48B extending vertically at each of the end portions of a pipe-shaped shaft 48A. The connection portion 48B is fixed to the vehicle transverse direction outer side end rear portion 44C of the pillar brace 44 by a fixing member such as a bolt 50 or the like.

Next, operation of the present sixth embodiment will be explained.

In the present sixth embodiment, the left and right front pillars 36 are connected to each other by the cross member 48. Therefore, it is possible to suppress deformation, toward the vehicle transverse direction outer side, of the front pillar 36 which deformation is caused by the force acting on the pillar brace 44, and in particular, by the force acting on the connection portion outwardly along the transverse direction of the vehicle (arrow F3 in FIG. 17).

The cross member 48 serving as the third reinforcing member may be joined in a vicinity of the vehicle transverse direction outer side end rear portion MC of the pillar brace 44.

Next, a seventh embodiment of the vehicle body front structure of the present invention will be explained with reference to FIGS. 18 to 21.

Members which are the same as those of the first embodiment are designated by the same reference numerals, and description thereof is omitted.

Figure 18:
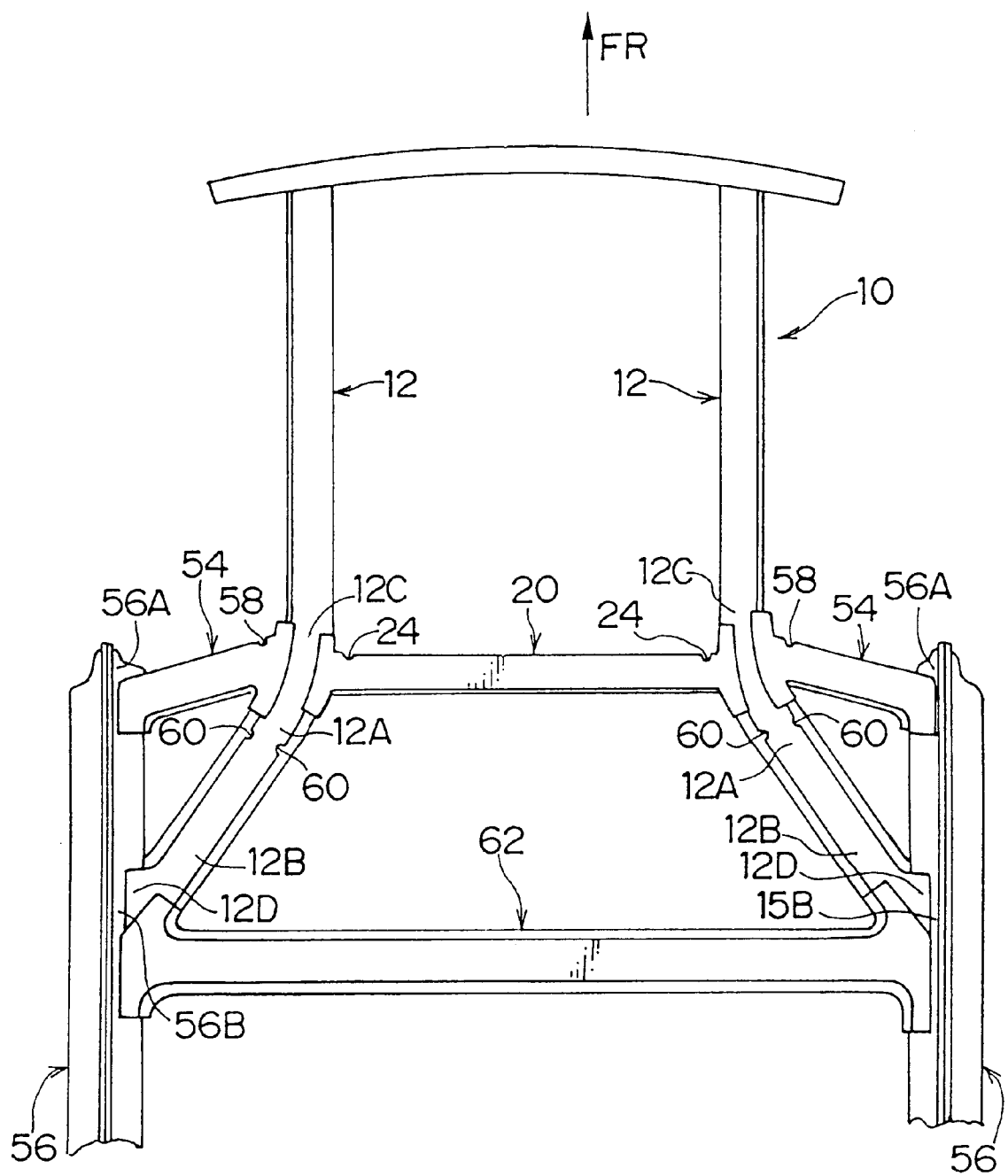
FIG. 18 is a plan view schematically showing a vehicle body front structure according to a seventh embodiment of the present invention.

As shown in FIG. 18, in the present seventh embodiment, torque boxes 54 serving as second reinforcing members are inserted between the rear portions 12C of the left and right front side members 12 and front end portions 56A of left and right sills 56 serving as frame members.

Figure 19:
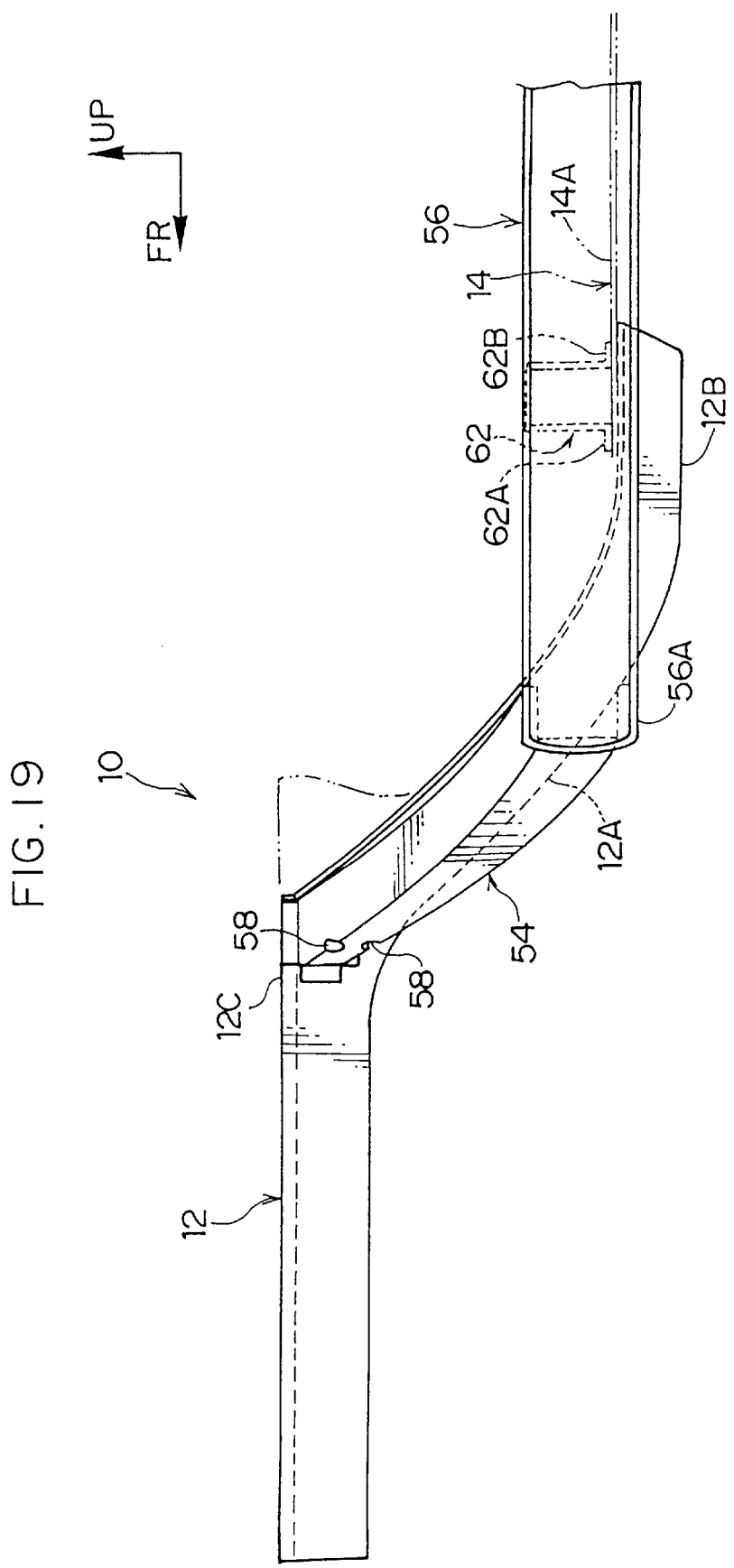
FIG. 19 is a side view schematically showing the vehicle body front structure according to the seventh embodiment of the present invention.

As shown in FIG. 19, the cross-sectional configuration of the torque box 54 as seen from the vehicle transverse direction is hat-shaped with the opening thereof directed toward the rear of the vehicle. The torque box 54 connects the rear portion 12C of the front side member 12 and the front end 56A of the sill 56.

Figure 20:
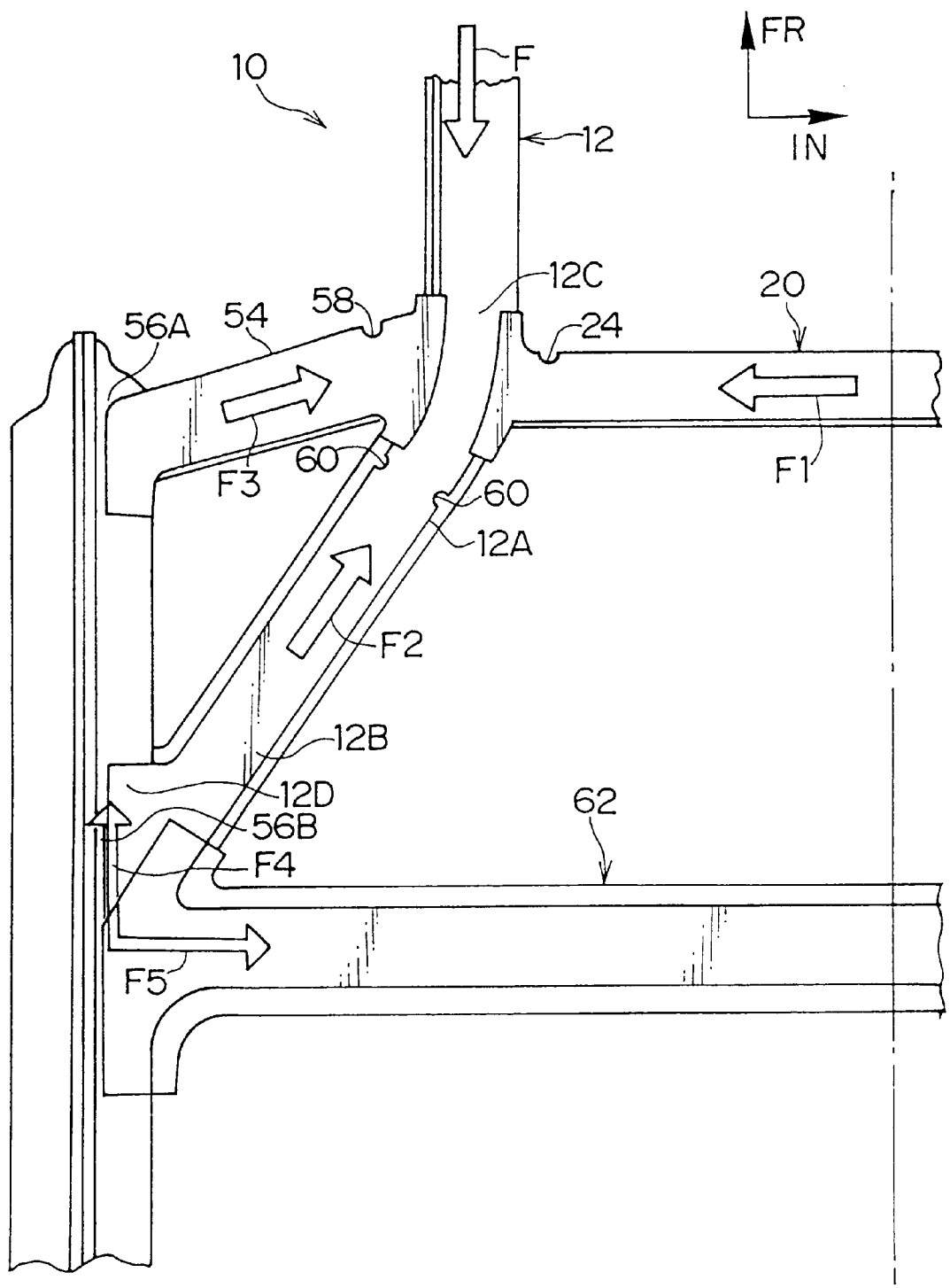
FIG. 20 is an enlarged plan view showing a portion of the vehicle body front structure according to the seventh embodiment of the present invention.

As shown in FIG. 20, recesses 58 serving as impact force absorbing portions are formed in the portion of the torque box 54 connected with the front side member 12. The recesses 58 are formed at opposing positions on the upper and lower ridgelines at the vehicle front side of the torque box 54. Due to the torque box 54 being compressively deformed in the axial direction with the recesses 58 as the starting points of the compressive deformation, the impact force (arrow F in FIG. 20) applied to the front side members 12 from the front of the vehicle is absorbed.

The inclined portion 12A and the horizontal portion 12B of the front side member 12 are bent diagonally, rearwardly, and toward the vehicle transverse direction outer side. A rear end 12D of the horizontal portion 12B is connected to a vehicle transverse direction inner side portion 56B located at a position separated by a predetermined distance rearwardly of the front end 56A of the sill 56. Recesses 60 serving as impact force absorbing portions are formed in the portion of the inclined portion 12A connected with the front side member 12. The recesses 60 are formed at opposing positions on the left and right ridgelines of the vehicle front side of the inclined portion 12A. Due to the inclined portion 12A compressively deforming in the axial direction starting at the recesses 60, the inclined portion 12A absorbs the impact force (arrow F in FIG. 20) applied to the front side member 12 from the front of the vehicle.

Further, in the present seventh embodiment, a floor cross member 62 is provided as a third reinforcing member and connects the connected portions of the left and right front side members 12 and the sills 56.

As shown in FIG. 19, the cross-sectional configuration of the floor cross member 62 as seen from the vehicle transverse direction is hat-shaped with the opening thereof directed downward. A front flange 62A and a rear flange 62B formed at the opening end portion are welded to the upper surface 14A of the dash lower panel 14. Accordingly, the floor cross member 62 together with the dash lower panel 14 form a closed sectional structure extending in the transverse direction of the vehicle.

Further, as shown in FIG. 18, the dash cross member 20, the inclined portions 12A and the horizontal portions 12B of the front side members 12, and the floor cross member 62 form a trapezoidal structure in plan view. As shown in FIG. 20, the impact force (arrow F in FIG. 20) applied to the front side member 12 is received by the supporting forces (arrows F1, F2 and F3 in FIG. 20) in the respective axial directions of the dash cross member 20, the inclined portion 12A and the horizontal portion 12B of the front side member 12, and the torque box 54. The supporting force (arrow F2 in FIG. 20) in the axial direction of the inclined portion 12A and the horizontal portion 12B of the front side member 12 is received by the supporting force (arrow F5 in FIG. 20) in the axial direction of the sill 56 and by the supporting force (arrow F6 in FIG. 20) in the axial direction of the floor cross member 62.

Next, operation of the present seventh embodiment will be explained.

In the present seventh embodiment, as shown in FIG. 20, the impact force (arrow F in FIG. 20) applied to the front side member 12 is received by the supporting forces (arrows F1, F2 and F3 in FIG. 20) in the respective axial directions of the dash cross member 20, the inclined portion 12A and the horizontal portion 12B of the front side member 12, and the torque box 54. The supporting force (arrow F2 in FIG. 20) in the axial direction of the inclined portion 12A and the horizontal portion 12B of the front side member 12 is received by the supporting force (arrow F5 in FIG. 20) in the axial direction of the sill 56 and the supporting force (arrow F6 in FIG. 20) in the axial direction of the floor cross member 62.

In a case in which an impact load (arrow F in FIG. 20) is applied to the left and right front side members 12 from the front of the vehicle, in order for the left and right front side members 12 to move substantially toward the rear of the vehicle, the connected portions of the front side members 12, the dash cross member 20 and the torque boxes 54 must deform by buckling.

In the present seventh embodiment, the recesses 24, 58, 60 are formed in the connected portions of the front side members 12, the dash cross member 20, and the torque boxes 54. As a result, when an impact load (arrow F in FIG. 20) is applied to the left and right front side members 12 from the front of the vehicle, the recesses 24, 58, 60 are the start of the compressive deformation, the moment is not transmitted to the inclined portions 12A and the horizontal portions 12B of the front side members 12, the dash cross member 20, and the torque boxes 54, the respective members are compressively deformed in the axial directions, and this compressive deformation proceeds while supporting a high reaction load.

Accordingly, the inclined portions 12A and the horizontal portions 12B of the front side members 12, the dash cross member 20 and the torque boxes 54 do not bend and do not fail to produce a reaction load. A stable impact force absorbing function can be improved, and therefore, the impact force applied to the front side members 12 can be efficiently absorbed.

Further, in the present seventh embodiment, the supporting force in the axial direction (arrow F2 in FIG. 20) of the inclined portion 12A and the horizontal portion 12B of the front side member 12 can be received by the supporting force (arrow F5 in FIG. 20) in the axial direction of the sill 56 and the supporting force (arrow F6 in FIG. 20) in the axial direction of the floor cross member 62. The impact force applied to the front side member 12 can thus be absorbed more efficiently.

Figure 21:
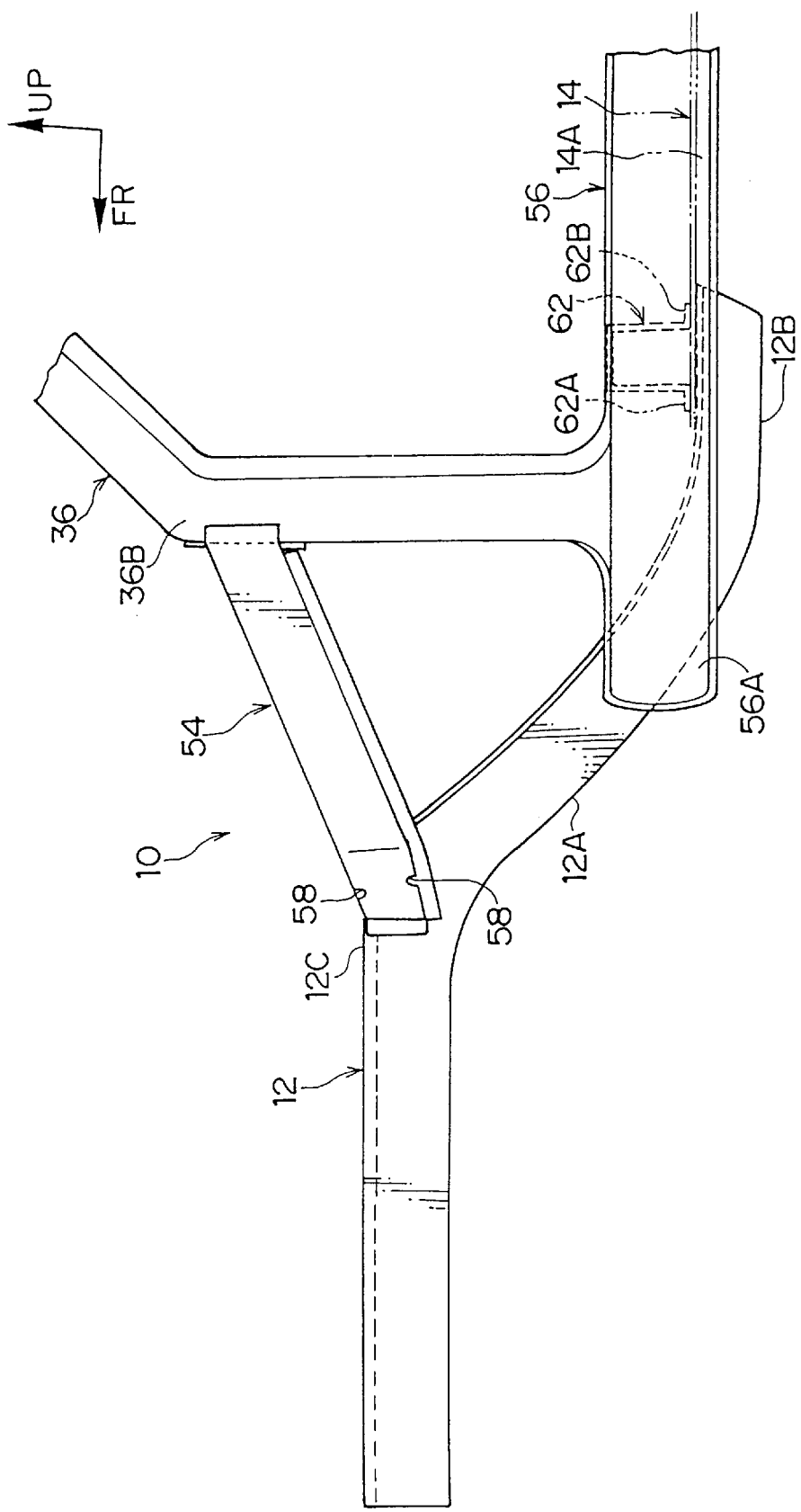
FIG. 21 is a side view schematically showing a vehicle body front structure according to a modified example of the seventh embodiment of the present invention.

In the vehicle front body structure according to the present seventh embodiment, as shown in FIG. 19, the torque boxes 54 serving as the second reinforcing members are disposed between the rear portions 12C of the left and right front side members 12 and the front ends 56A of the sills 56 serving as frame members. Alternatively, as illustrated in FIG. 21, the torque boxes 54 serving as the second reinforcing members may be disposed between the rear portions 12C of the left and right front side members 12 and vicinities of bent portions 36B formed at substantially vertical central portions of the front pillars 36 serving as frame members.

Next, an eighth embodiment of the vehicle body front structure of the present invention will be explained with reference to FIGS. 22 to 26.

Members which are the same as those of the first embodiment are denoted by the same reference numerals, and description thereof is omitted.

Figure 22:
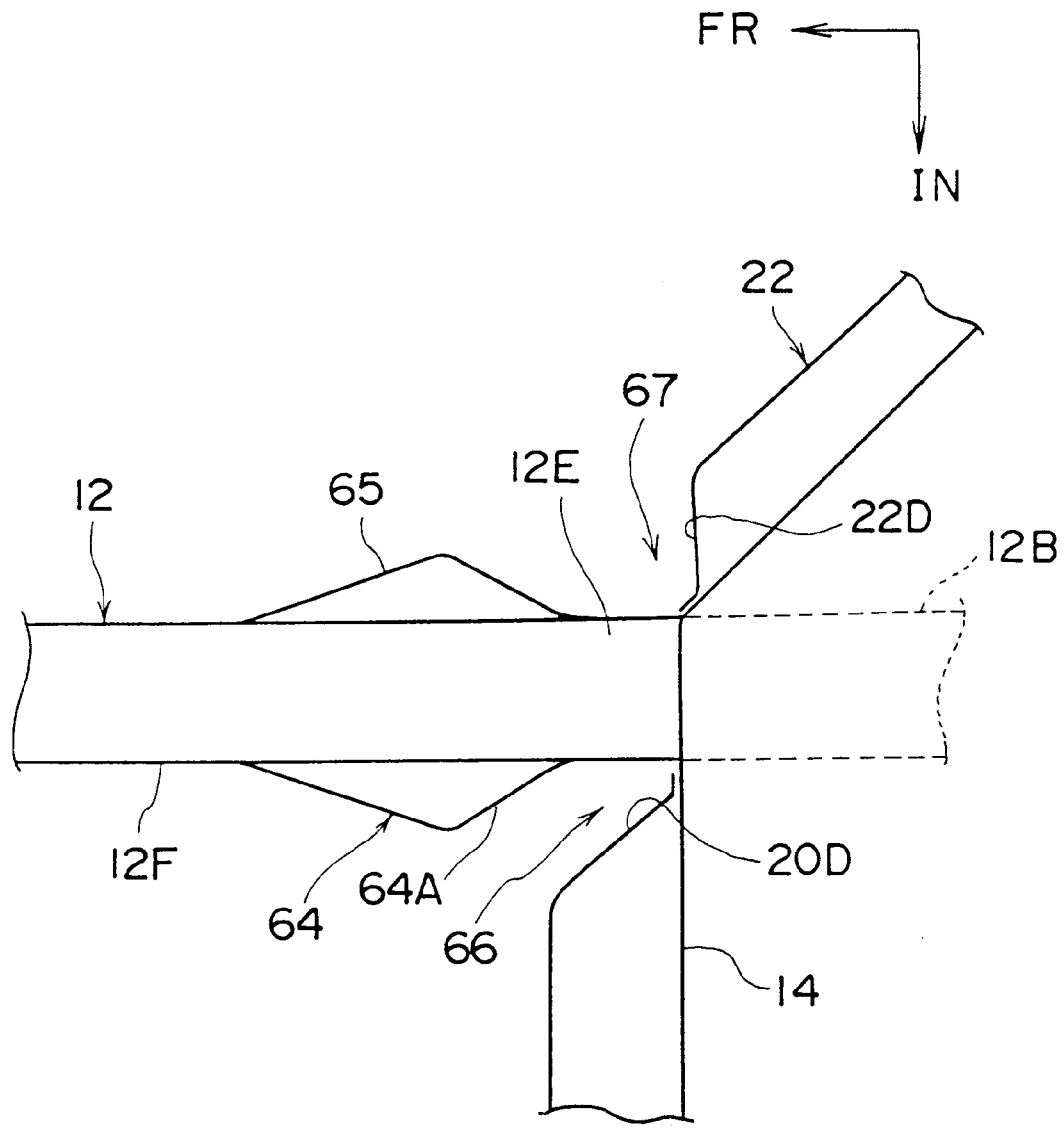
FIG. 22 is a plan view schematically showing a vehicle body front structure according to an eighth embodiment of the present invention.

As shown in FIG. 22, in the present eighth embodiment, bulging portions 64, 65, which serve as impact force absorbing portions and which bulge in the vehicle transverse direction, are formed at the rear portions of the left and right front side members 12. A deforming portion 12E is formed between the bulging portions 64, 65 of the front side member 12 and the portion connected with the dash lower panel 14. This deforming portion 12E is compressively deformed by an axial direction load.

Figure 23:
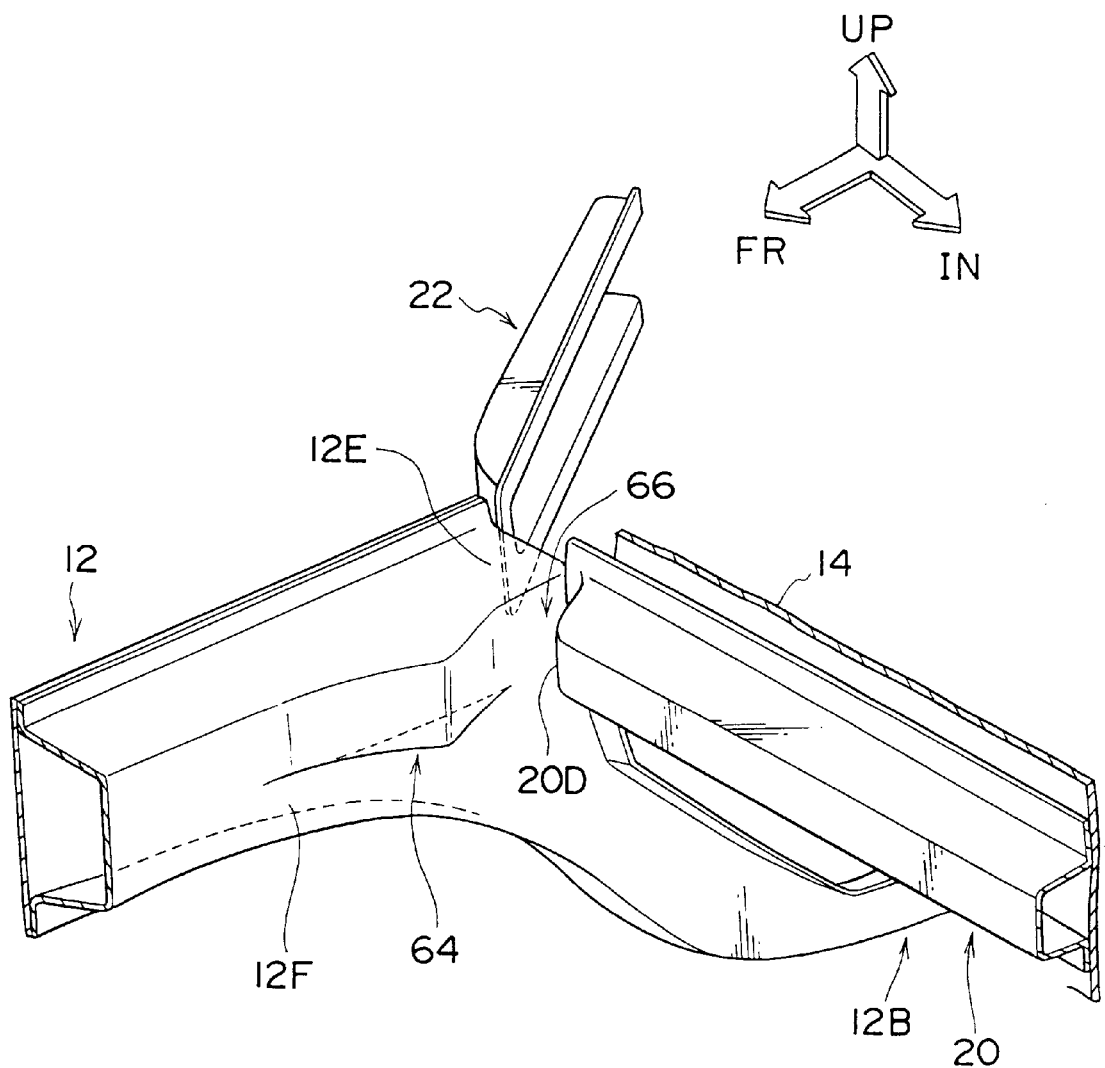
FIG. 23 is a perspective view of the vehicle body front structure according to the eighth embodiment of the present invention as taken diagonally from a front inner side of a vehicle.

As shown in FIG. 23, the bulging portion 64 is formed at the upper portion of a vehicle transverse direction inner-side side-wall portion 12F of the front side member 12 and is triangular in plan view. A cut portion 66 serving as an impact force absorbing portion is formed in the portion of the dash cross member 20 connected with the front side member 12. An end surface 20D of the dash cross member 20 forming the cut portion 66 is substantially parallel to a rear side surface 64A of the bulging portion 64. In a case in which the front side member 12 compressively deforms at the deforming portion 12E, as shown by a two-dot chain line in FIG. 25, the rear side surface 64A of the bulging portion 64 abuts the end surface 20D of the dash cross member 20.

Figure 24:
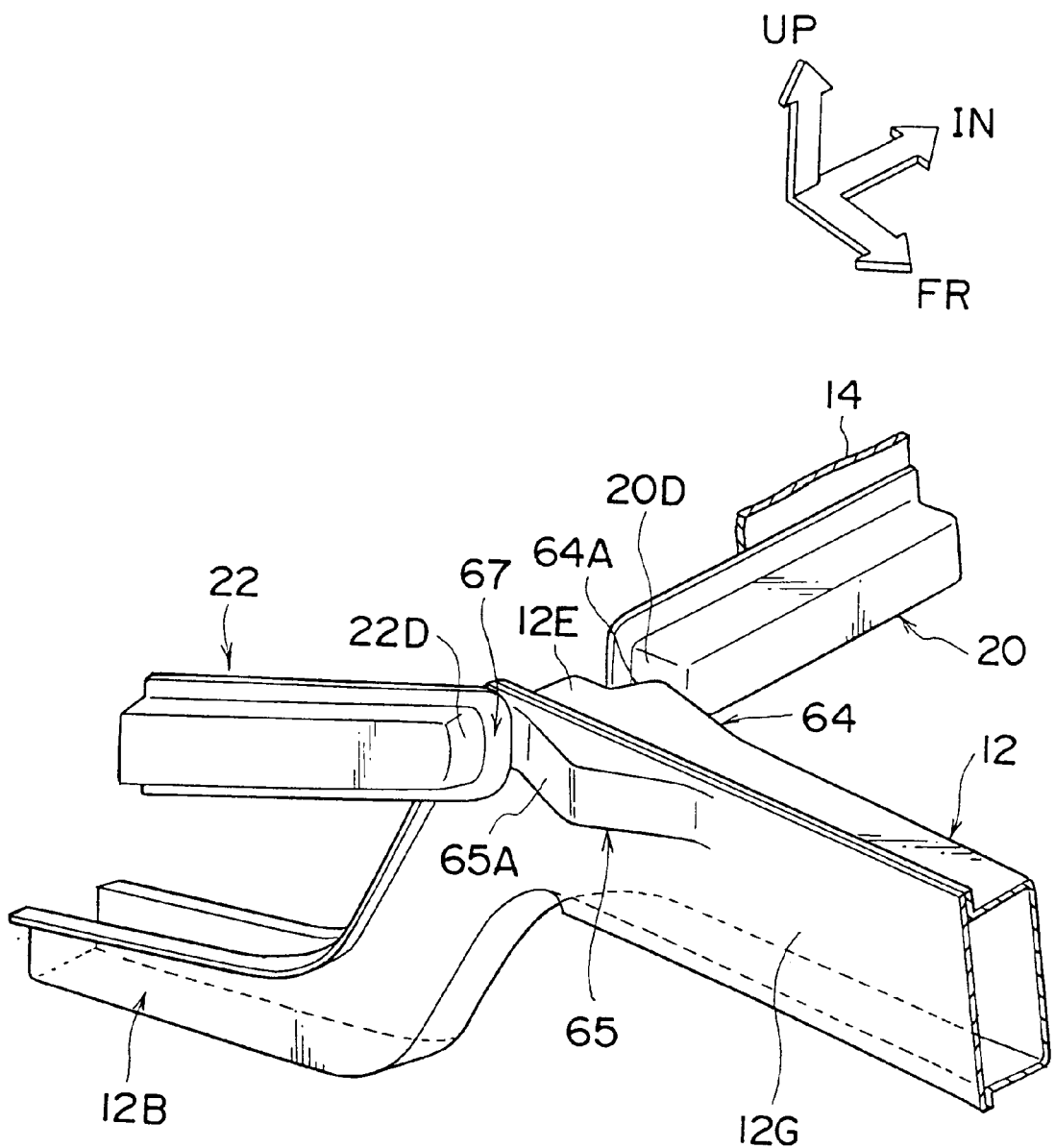
FIG. 24 is a perspective view of the vehicle body front structure according to the eighth embodiment of the present invention as taken diagonally from the front outer side of a vehicle.

As shown in FIG. 24, the bulging portion 65 is formed in the upper portion of a vehicle transverse direction outer-side side-wall portion 12G of the front side member 12 and is triangular in plan view. A cut portion 67 serving as an impact force absorbing portion is formed in the portion of the pillar brace 22 connected with the front side member 12. An end surface 22D of the pillar brace 22 forming the cut portion 67 is substantially parallel to a rear side surface 65A of the bulging portion 65. In a case in which the front side member 12 compressively deforms at the deforming portion 12E, as shown by a two-dot chain line in FIG. 25, the rear side surface 65A of the bulging portion 65 abuts the end surface 22D of the pillar brace 22.

Next, operation of the present eighth embodiment will be explained.

Figure 25:
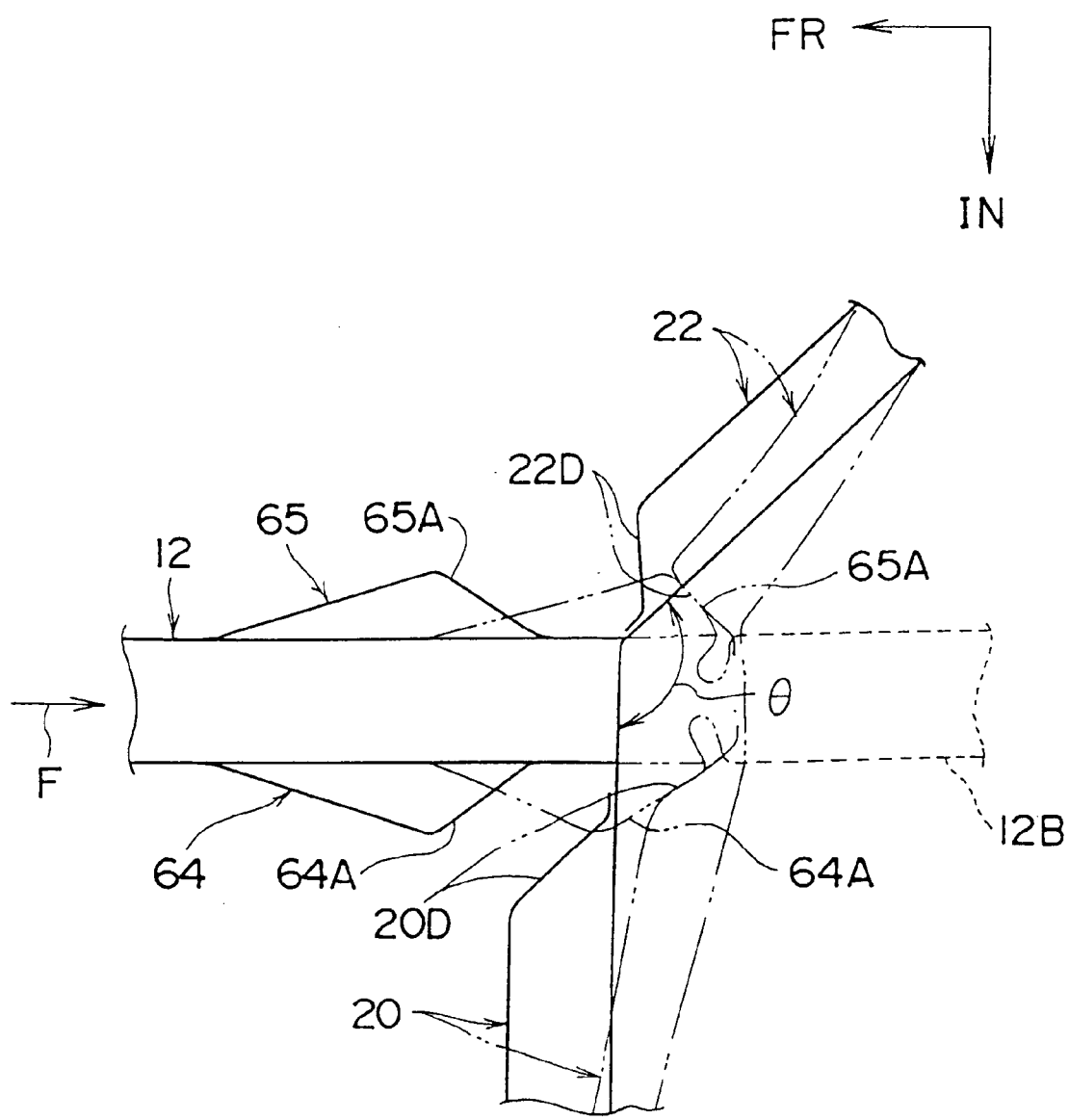
FIG. 25 is a diagram for explaining operation of the vehicle body front structure according to the eighth embodiment of the present invention.
Figure 26:
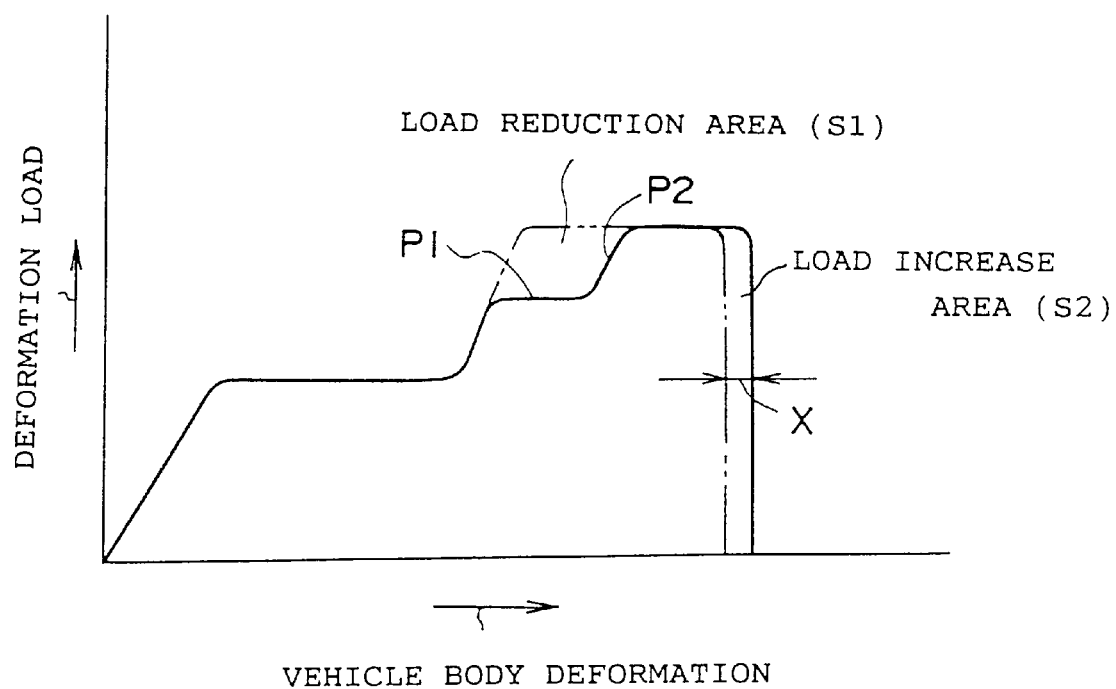
FIG. 26 is a graph showing the relationship between an amount of vehicle body deformation and deformation load at the vehicle body structure according to the eighth embodiment of the present invention.

In the present eighth embodiment, as shown in FIG. 25, when an impact force (arrow F in FIG. 25) is applied to the front side member 12, the deforming portion 12E of the front side member 12 compressively deforms under a small load (region P1 in FIG. 26). After this compressive deformation, the rear side surface 64A of the bulging portion 64 abuts the end surface 20D of the dash cross member 20, and the rear side surface 65A of the bulging portion 65 abuts the end surface 22D of the pillar brace 22, so that the deformation load applied to the dash cross member 20 and the pillar brace 22 by the respective axial forces increases (region P2 in FIG. 26).

As a result, as shown in FIG. 26, as compared with a case lacking the structure of the present eighth embodiment (the case indicated by the two-dot chain line in FIG. 26), in the eighth embodiment, as illustrated by the solid line, the amount of deformation of the vehicle body is increased (amount of increase X) by an amount equivalent to the reduction (area S1) of the load at the deforming portion 12E of the front side member 12. The area S2 of the region of the increase in load due to the increased amount of deformation of the vehicle body is equal to the area S1 (S2=S1).

Accordingly, in the present eighth embodiment, the dash cross member 20 and the pillar brace 22 are compressively deformed in the manner shown by two-dot chain lines in FIG. 25 from the connection points thereof with the front side member 12. Along with this compressive deformation, the dash cross member 20 and the pillar brace 22 are displaced, in a direction of increasing the angle θ therebetween, about fulcra which are the connection point with the tunnel reinforcement and the connection point with the front pillar. Thus, the impact force applied to the front side member 12 can be absorbed efficiently by the intended deformation of the dash cross member 20 and the pillar brace 22, and the crush stroke can be increased.

Figure 27:
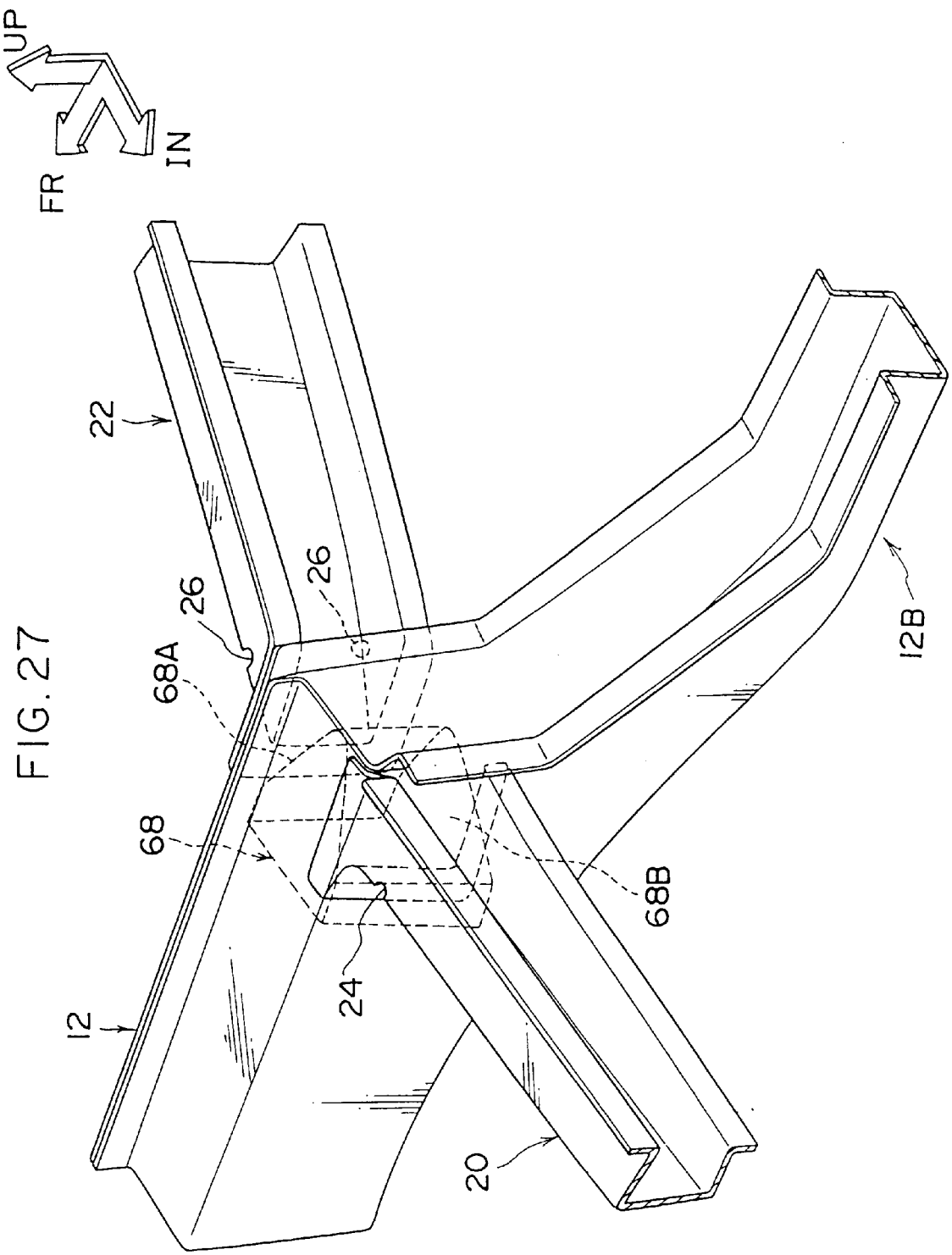
FIG. 27 is a perspective view of a vehicle body front structure according to a modified example of the eighth embodiment of the present invention as taken diagonally from the rear inner side of a vehicle.
Figure 28:
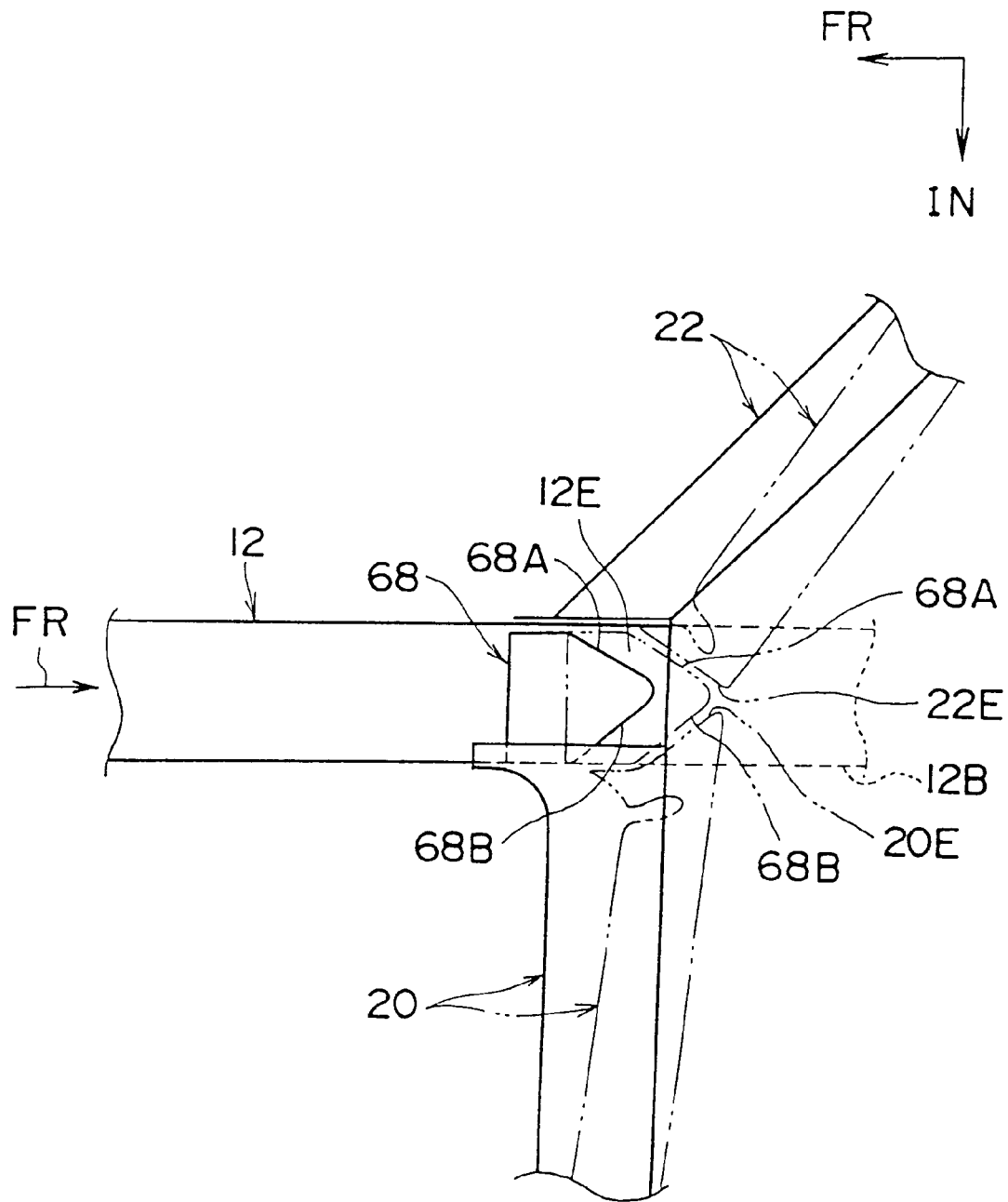
FIG. 28 is a diagram for explaining the operation of the vehicle body front structure according to the modified example of the eighth embodiment of the present invention.
Figure 29:
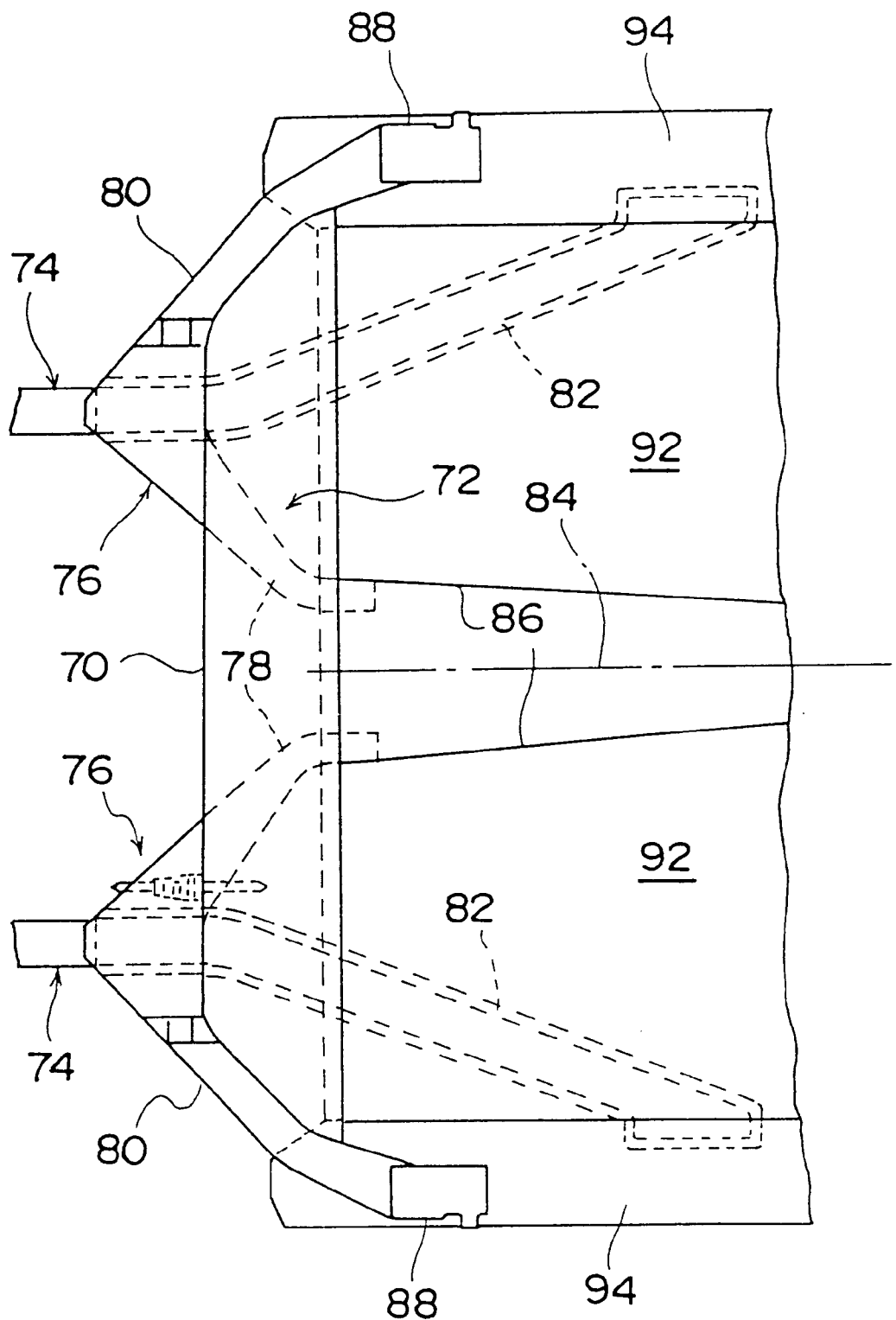
FIG. 29 is a plan view schematically showing a vehicle body front structure relating to a conventional example.

In the vehicle body front structure according to the present eighth embodiment, the bulging portions 64, 65 are provided at the front side of the deforming portion 12E of the front side member 12. However, in place of the bulging portions 64, 65, a reinforcement 68 serving as an impact force transmitting portion may be provided as shown in FIG. 27. As shown in FIG. 28, the reinforcement 68 is fixed to the inner peripheral portion of the front side member 12. A rear end surface of the reinforcement 68 is bent in a V-shape as seen in plan view. As shown by a two-dot chain line in FIG. 28, in a case in which the front side member 12 is compressively deformed at the deforming portion 12E, one side 68A of the rear end surface of the reinforcement 68 abuts an end surface 22E of the pillar brace 22, and another side 68B of the rear end surface of the reinforcement 68 abuts the end surface 22E of the dash cross member 20.

Although specific embodiments of the invention have been described in detail above, the present invention is not limited to these embodiments, and it should be clear to a person skilled in the art that various other embodiments are possible within the scope of the present invention.

INDUSTRIAL APPLICABILITY

As described above, the vehicle body front structure and method of absorbing an impact by a vehicle body front structure relating to the present invention are useful for absorbing an impact force applied to a front side member when a vehicle is in a collision, and are particularly suited to efficiently absorbing an impact force at the rear portion of the front side member.

What is claimed is:

1. A vehicle body front structure in which a plurality of reinforcing members supported at frame members having stable configurations are connected to rear portions of front side members extending substantially horizontally in a vehicle longitudinal direction and provided so as to be offset upwardly from a floor panel, and an impact force applied to said front side members from a front of a vehicle is supported by compressive forces in axial directions of said plurality of reinforcing members, wherein each of said plurality of reinforcing members has a closed cross-section, wherein a locus of movement of one of the reinforcing members overlaps with a locus of movement of another of said reinforcing members at the time the impact force is applied to the front side members, wherein at least one of said reinforcing members has an impact force absorbing portion at a portion connected with said front side member, said impact force absorbing portion compressively deforming in the axial direction of said reinforcing member and absorbing the impact force applied to said front side members from the front of the vehicle, and said at least one of said reinforcing members is a supporting structure displaceable, in a direction of increasing an angle between said reinforcing members, in accordance with compressive deformation at said impact force absorbing portion.

2. A vehicle body front structure according to claim 1, wherein said at least one of said reinforcing members is a supporting structure displaceable, in a direction of increasing the angle between said plurality of reinforcing members, about a fulcrum which is a connection point with said frame member having a stable configuration, in accordance with compressive deformation at said impact force absorbing portion when an impact force is applied to said front side members from the front of the vehicle.

3. A vehicle body front structure according to claim 1, wherein said reinforcing members include a first reinforcing member, which connects rear portions of said front side members provided at the left and the right to a frame member having a stable configuration and provided at a vehicle transverse direction inner side, and second reinforcing members, which connect the rear portions of said front side members to frame members having stable configurations and provided at vehicle transverse direction outer sides.

4. A vehicle body front structure according to claim 3, wherein said first reinforcing member connects the rear portions of said front side members to each other along a vehicle transverse direction.

5. A vehicle body front structure according to claim 3, wherein said first reinforcing member is connected to a frame member having a stable configuration and provided at a vehicle transverse direction inner side floor tunnel portion.

6. A vehicle body front structure according to claim 1, wherein the one of said reinforcing members is displaced, at the time the impact force is applied to said front side members, so as to rotate substantially toward a rear of the vehicle around an end portion of said one of said reinforcing members, said end portion being opposite to a portion of said one of the reinforcing members at which said one of the reinforcing members is connected to said front side member.

7. A vehicle body front structure according to claim 1, wherein the other of said reinforcing members is displaced, at the time the impact force is applied to said front side members, so as to rotate substantially toward a rear of the vehicle around a portion of said other of reinforcing members, said end portion being opposite to a portion of said other of the reinforcing members at which said other of the reinforcing members is connected to said front side member.

* * * * *